United States Patent
Onsen

(10) Patent No.: US 9,104,346 B2
(45) Date of Patent: Aug. 11, 2015

(54) INFORMATION PROCESSING APPARATUS AND CONTROL METHOD THEREOF

(75) Inventor: Takahiro Onsen, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1074 days.

(21) Appl. No.: 12/786,267

(22) Filed: May 24, 2010

(65) Prior Publication Data

US 2010/0302566 A1 Dec. 2, 2010

(30) Foreign Application Priority Data

May 28, 2009 (JP) ................................ 2009-129198

(51) Int. Cl.
*G06K 15/02* (2006.01)
*G06F 3/12* (2006.01)

(52) U.S. Cl.
CPC ............ *G06F 3/1204* (2013.01); *G06F 3/1254* (2013.01)

(58) Field of Classification Search
CPC .............................. G06F 17/211; G06F 3/1204
See application file for complete search history.

(56) References Cited

U.S. PATENT DOCUMENTS

| | | | | |
|---|---|---|---|---|
| 5,987,227 A * | 11/1999 | Endo et al. | ................... | 358/1.13 |
| 6,473,196 B2 * | 10/2002 | Usami et al. | ................. | 358/1.18 |
| 2003/0056177 A1 * | 3/2003 | Nara et al. | ................... | 715/525 |
| 2004/0126122 A1 * | 7/2004 | Kanamoto et al. | ............. | 399/20 |
| 2004/0194033 A1 * | 9/2004 | Holzwarth et al. | ........... | 715/530 |
| 2005/0105116 A1 * | 5/2005 | Kobashi | ....................... | 358/1.12 |
| 2006/0238810 A1 * | 10/2006 | Fukudome | ................... | 358/1.16 |
| 2007/0002352 A1 * | 1/2007 | Ushio et al. | ................... | 358/1.13 |
| 2007/0014590 A1 * | 1/2007 | Sakai et al. | ................... | 399/194 |
| 2007/0014611 A1 * | 1/2007 | Nakamura et al. | ............ | 399/407 |
| 2008/0266597 A1 * | 10/2008 | Ushio | .......................... | 358/1.15 |
| 2009/0273802 A1 * | 11/2009 | Kajiyama | .................... | 358/1.15 |
| 2010/0284721 A1 * | 11/2010 | Nakamura | .................... | 399/407 |

FOREIGN PATENT DOCUMENTS

| | | |
|---|---|---|
| CN | 101431584 A | 5/2009 |
| JP | 2000-185446 A | 7/2000 |
| JP | 2003-091521 A | 3/2003 |
| JP | 2005-115683 A | 4/2005 |

* cited by examiner

*Primary Examiner* — Beniyam Menberu

(74) *Attorney, Agent, or Firm* — Canon USA Inc. IP Division

(57) ABSTRACT

An apparatus includes a subset staple setting unit configured to divide one print data into a plurality of subsets and to set a stapling position for each subset, a page layout setting unit configured to set a page layout of the print data, and an adjustment unit configured to adjust, if the page layout is changed when a setting of the stapling position for each subset is specified, the setting.

3 Claims, 25 Drawing Sheets

FIG.7

| SUBSET NUMBER | SUBSET TOP PAGE NUMBER | NUMBER OF STAPLES | STAPLING POSITION |
|---|---|---|---|
| 1 | 1 | 1 | UPPER-LEFT CORNER |
| 2 | 4 | 1 | UPPER-LEFT CORNER |
| 3 | 9 | 1 | UPPER-LEFT CORNER |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |

FIG.8

PRINT EXECUTION COMMAND ~801
  OUTPUT PAPER SIZE: A4
  NUMBER OF COPIES: 1 COPY
  PAPER ORIENTATION: PORTRAIT
  ZOOM RATIO: 100%
  PRINTING MODE: ONE-SIDED PRINTING
  BINDING DIRECTION: LONG SIDE BINDING (LEFT)
  BINDING MARGIN: 0mm
  PAPER DISCHARGE MODE: STAPLE SORT
  NUMBER OF SUBSETS: 3
  DISCHARGE DESTINATION: AUTO

SUBSET 1 PRINT COMMAND ~802
  SUBSET TOP PAGE NUMBER: 1
  STAPLE INFORMATION
    NUMBER OF STAPLES: 1
    STAPLING POSITION: UPPER-LEFT CORNER
  IMAGE DATA INFORMATION
    IMAGE DATA OF PAGE 1 OF DOCUMENT
    IMAGE DATA OF PAGE 2 OF DOCUMENT
    IMAGE DATA OF PAGE 3 OF DOCUMENT

SUBSET 2 PRINT COMMAND ~803
  SUBSET TOP PAGE NUMBER: 4
  STAPLE INFORMATION
    NUMBER OF STAPLES: 1
    STAPLING POSITION: 1
  IMAGE DATA INFORMATION
    IMAGE DATA OF PAGE 4 OF DOCUMENT
    IMAGE DATA OF PAGE 5 OF DOCUMENT
    IMAGE DATA OF PAGE 6 OF DOCUMENT
    IMAGE DATA OF PAGE 7 OF DOCUMENT
    IMAGE DATA OF PAGE 8 OF DOCUMENT

SUBSET 3 PRINT COMMAND ~804
  SUBSET TOP PAGE NUMBER: 9
  STAPLE INFORMATION
    NUMBER OF STAPLES: 1
    STAPLING POSITION: 1
  IMAGE DATA INFORMATION
    IMAGE DATA OF PAGE 9 OF DOCUMENT
    IMAGE DATA OF PAGE 10 OF DOCUMENT
    IMAGE DATA OF PAGE 11 OF DOCUMENT
    IMAGE DATA OF PAGE 12 OF DOCUMENT

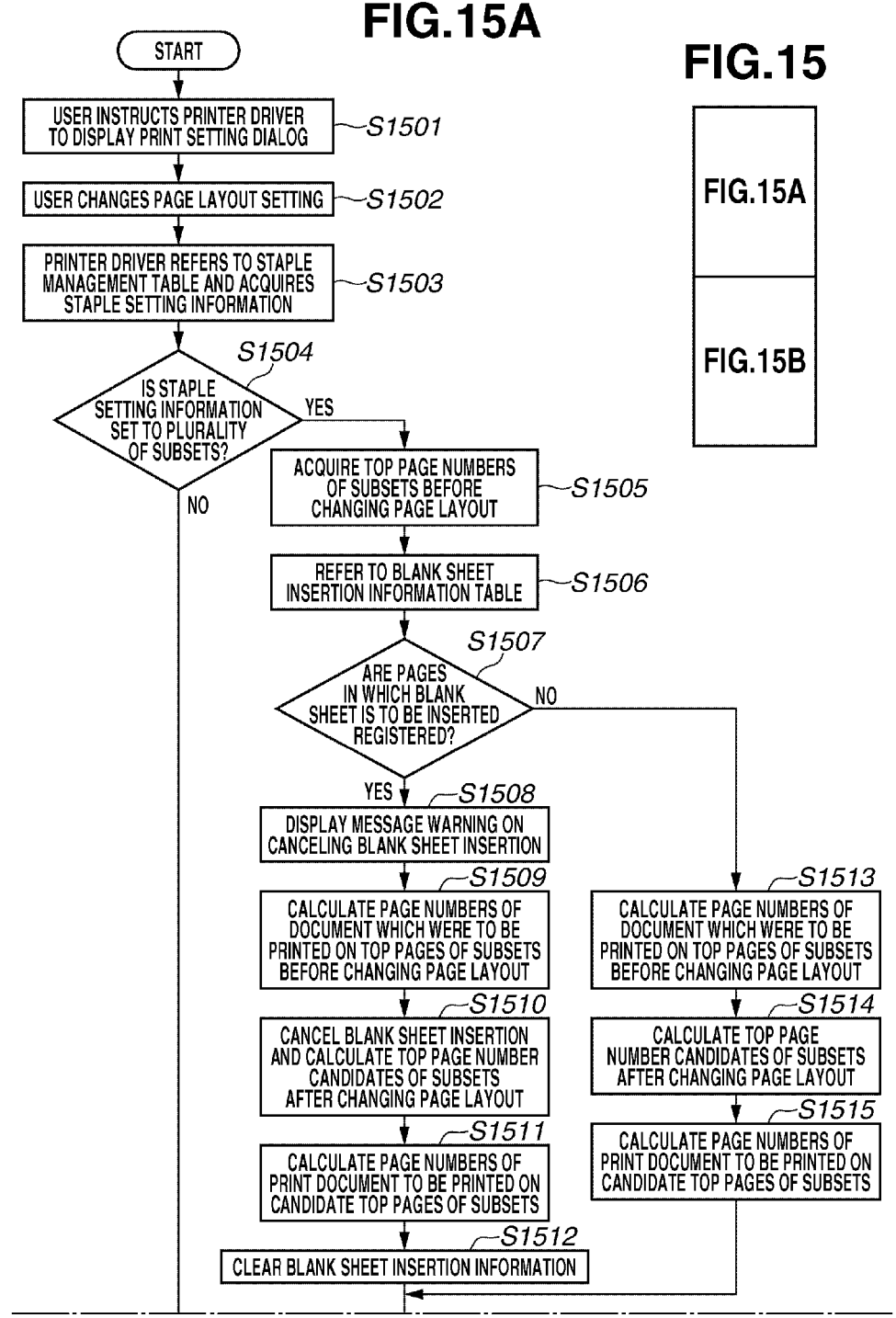

FIG.20

| SUBSET NUMBER 2201 | SUBSET TOP PAGE NUMBER 2202 | NUMBER OF STAPLES 2203 | STAPLING POSITION 2204 |
|---|---|---|---|
| 1 | 1 | 1 | UPPER-LEFT CORNER |
| 2 | 3 | 1 | UPPER-LEFT CORNER |
| 3 | 5 | 1 | UPPER-LEFT CORNER |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |

FIG.21

| SUBSET NUMBER (2301) | SUBSET TOP PAGE NUMBER (2302) | NUMBER OF STAPLES (2303) | STAPLING POSITION (2304) |
|---|---|---|---|
| 1 | 1 | 1 | UPPER-LEFT CORNER |
| 2 | 3 | 1 | UPPER-LEFT CORNER |
| 3 | 6 | 1 | UPPER-LEFT CORNER |
| 4 | 0 | 0 | 0 |
| 5 | 0 | 0 | 0 |
| 6 | 0 | 0 | 0 |
| 7 | 0 | 0 | 0 |
| 8 | 0 | 0 | 0 |
| 9 | 0 | 0 | 0 |
| 10 | 0 | 0 | 0 |

FIG.23

PRINT EXECUTION COMMAND ～2501
  OUTPUT PAPER SIZE: A4
  NUMBER OF COPIES: 1 COPY
  PAPER ORIENTATION: PORTRAIT
  ZOOM RATIO: 100%
  PRINTING MODE: ONE-SIDED PRINTING
  BINDING DIRECTION: LONG SIDE BINDING (LEFT)
  BINDING MARGIN: 0mm
  PAPER DISCHARGE MODE: STAPLE SORT
  NUMBER OF SUBSETS: 3
  DISCHARGE DESTINATION: AUTO

SUBSET 1 PRINT COMMAND ～2502
  SUBSET TOP PAGE NUMBER: 1
  STAPLE INFORMATION
    NUMBER OF STAPLES: 1
    STAPLING POSITION: UPPER-LEFT CORNER
  IMAGE DATA INFORMATION
    IMAGE DATA OF PAGE 1 (2in1)
    IMAGE DATA OF PAGE 2 (2in1)

SUBSET 2 PRINT COMMAND ～2503
  SUBSET TOP PAGE NUMBER: 3
  STAPLE INFORMATION
    NUMBER OF STAPLES: 1
    STAPLING POSITION: 1
  IMAGE DATA INFORMATION
    IMAGE DATA OF PAGE 3 (2in1)
    IMAGE DATA OF PAGE 4 (2in1)

SUBSET 3 PRINT COMMAND ～2504
  SUBSET TOP PAGE NUMBER: 5
  STAPLE INFORMATION
    NUMBER OF STAPLES: 1
    STAPLING POSITION: 1
  IMAGE DATA INFORMATION
    IMAGE DATA OF PAGE 5 (2in1)
    IMAGE DATA OF PAGE 6 (2in1)

FIG.24

PRINT EXECUTION COMMAND ~2601
  OUTPUT PAPER SIZE: A4
  NUMBER OF COPIES: 1 COPY
  PAPER ORIENTATION: PORTRAIT
  ZOOM RATIO: 100%
  PRINTING MODE: ONE-SIDED PRINTING
  BINDING DIRECTION: LONG SIDE BINDING (LEFT)
  BINDING MARGIN: 0mm
  PAPER DISCHARGE MODE: STAPLE SORT
  NUMBER OF SUBSETS: 3
  DISCHARGE DESTINATION: AUTO

SUBSET 1 PRINT COMMAND ~2602
  SUBSET TOP PAGE NUMBER: 1
  STAPLE INFORMATION
    NUMBER OF STAPLES: 1
    STAPLING POSITION: UPPER-LEFT CORNER
  IMAGE DATA INFORMATION
    IMAGE DATA OF PAGE 1 (2in1)
    IMAGE DATA OF PAGE 2 (2in1)

SUBSET 2 PRINT COMMAND ~2603
  SUBSET TOP PAGE NUMBER: 3
  STAPLE INFORMATION
    NUMBER OF STAPLES: 1
    STAPLING POSITION: 1
  IMAGE DATA INFORMATION
    IMAGE DATA OF PAGE 3 (2in1)
    IMAGE DATA OF PAGE 4 (2in1)
    IMAGE DATA OF PAGE 5 (2in1)

SUBSET 3 PRINT COMMAND ~2604
  SUBSET TOP PAGE NUMBER: 6
  STAPLE INFORMATION
    NUMBER OF STAPLES: 1
    STAPLING POSITION: 1
  IMAGE DATA INFORMATION
    IMAGE DATA OF PAGE 6 (2in1)
    IMAGE DATA OF PAGE 7 (2in1)

INFORMATION PROCESSING APPARATUS AND CONTROL METHOD THEREOF

BACKGROUND OF THE INVENTION

1. Field of the Invention

The present invention relates to an information processing apparatus which includes a printer driver for controlling a printing operation of a printer apparatus, and a control method thereof.

2. Description of the Related Art

In recent years, there have been marketed highly-functional printer apparatuses including a stapling function for binding and outputting a plurality of pages of printed sheets. Conventionally, a printer driver is used to control the printer apparatus to perform processes such as printing, and a printer driver for controlling the printer apparatus having a stapling function sets a stapling position and the number of staples, and the position and size of a binding margin.

For example, Japanese Patent Application Laid-Open No. 2000-185446 discusses a method performed by the printer driver for setting a stapling position and the number of staples. More specifically, Japanese Patent Application Laid-Open No. 2000-185446 discusses a method for installing a user interface which receives a user input to set the stapling position, and a method for displaying the set stapling position as a print preview. In the example, only one stapling position can be set with respect to all print data included in one print job.

Further, there is a printer driver which includes a new user interface in a print preview screen for setting the stapling position and the number of staples. However, such a printer driver can also only set one stapling position with respect to all print data included in one print job in.

As described above, only one stapling position can be set with respect to all print data included in one print job in a conventional printer driver. As a result, a user is unable to specify a setting such as dividing the print data included in one print job into a plurality of subsets and stapling each of the plurality of subsets, or stapling a portion of the subsets.

SUMMARY OF THE INVENTION

According to an aspect of the present invention, an apparatus includes a subset staple setting unit configured to divide one print data into a plurality of subsets and to set a stapling position for each subset, a page layout setting unit configured to set a page layout of the print data, and an adjustment unit configured to adjust, if the page layout is changed when a setting of the stapling position for each subset is specified, the setting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates a staple setting management table.

FIG. 8 illustrates an example of print data.

FIG. 20 illustrates a staple setting management table.

FIG. 21 illustrates a staple setting management table.

FIG. 23 illustrates an example of print data.

FIG. 24 illustrates an example of print data.

DESCRIPTION OF THE EMBODIMENTS

Various exemplary embodiments, features, and aspects of the invention will be described in detail below with reference to the drawings.

Figure 1:
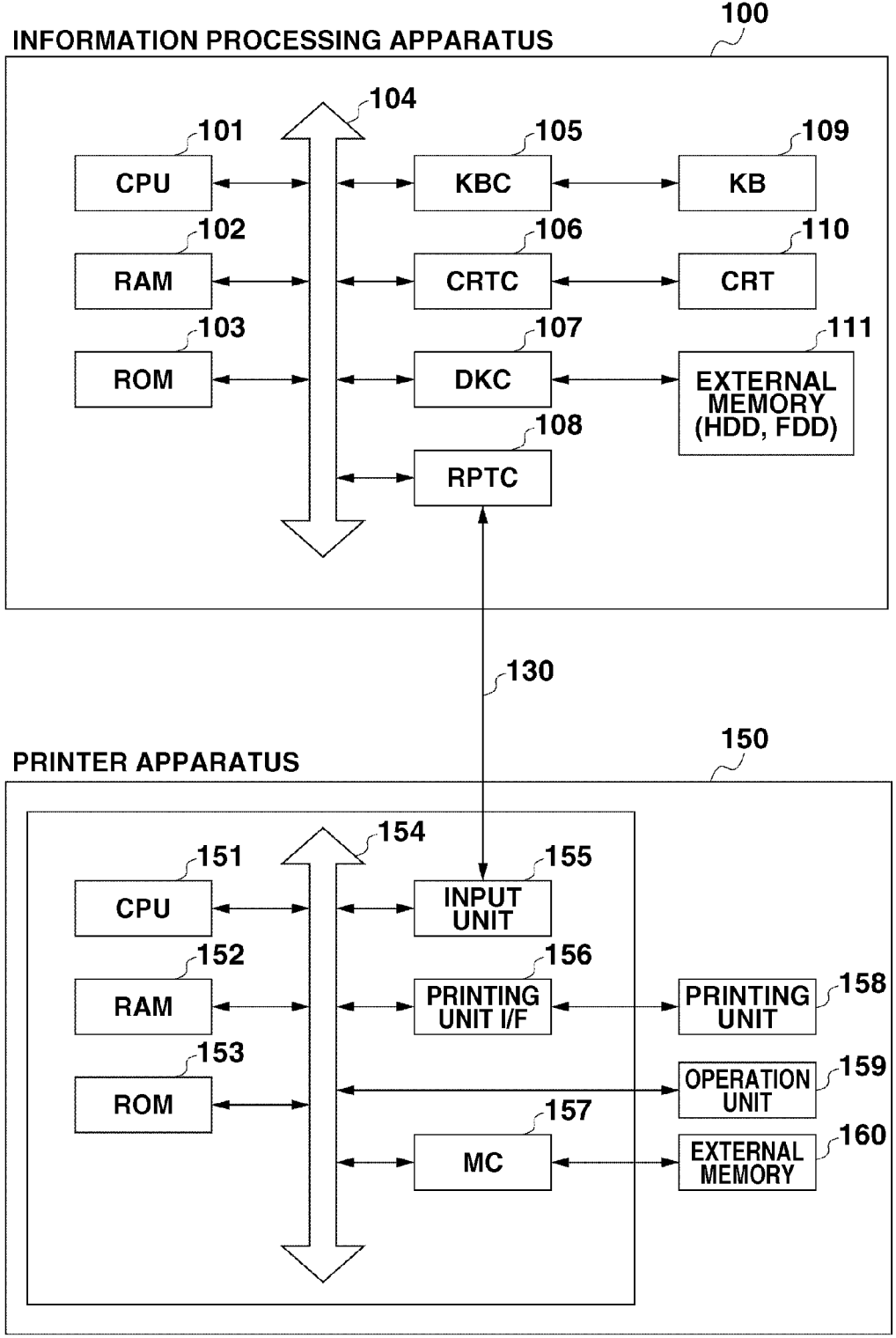
FIG. 1 illustrates a configuration of a printing system according to a first exemplary embodiment of the present invention.

FIG. 1 illustrates a configuration of a printing system according to a first exemplary embodiment of the present invention. Referring to FIG. 1, the printing system includes an information processing apparatus 100 and a printer apparatus 150, which are connected via a bi-directional interface 130.

The information processing apparatus 100 includes a central processing unit (CPU) 101, which performs processing of documents configured of graphics, images, text, and tables (including spreadsheets), and a ROM 103. The CPU 101 performs document processing according to a document processing program stored in an external memory 111. The CPU 101 also integrally controls each device connected to a system bus 104. The external memory 111 stores an operating system (OS), which is a control program for the CPU 101, a boot program, various applications, font data, user files, and a printer control command generation program (hereinafter referred to as a printer driver). A random access memory (RAM) 102 functions as a main memory and a work area for the CPU 101.

A keyboard controller (KBC) 105 controls key input from a keyboard 109 or a pointing device (not illustrated). A cathode ray tube controller (CRTC) 106 controls display of a CRT display (CRT) 110. A disk controller (DKC) 107 controls access to the external memory 111 such as a hard disk (HDD)

or a flexible disk (FDD). A printer controller (PRTC) 108 is connected to the printer apparatus 150 via the bi-directional interface 130 and performs communication control with the printer apparatus 150.

The CPU 101 executes an outline font rasterization process onto a display information RAM set in the RAM 102, thus allowing "what you see is what you get" (WYSIWYG) on the CRT 110. Further, the CPU 101 opens various registered windows according to commands designated by a mouse cursor (not illustrated) on the CRT 110 and executes various data processes. Upon printing, the user opens a print settings window and can set print process parameters for the printer driver, which includes printer settings and print mode selection.

The printer apparatus 150 is controlled by a CPU 151. The CPU 151 outputs an image signal as output information to a printing unit (printer engine) 158 connected to a system bus 154 via a printing unit I/F 156, based on a control program stored in a read-only memory (ROM) 153 or an external memory 160. The ROM 153 further stores a control program of the CPU 151. A font ROM in the ROM 153 stores font data used in generating the output information, and a data ROM in the ROM 153 stores information used by the information processing apparatus 100 when the printer does not include the external memory 160 such as a hard disk. The CPU 151 can communicate with the information processing apparatus 100 via an input unit 155 and can notify the information processing apparatus 100 of information on the printer apparatus 150. A RAM 152 functions as the main memory and the work area for the CPU 151, and its memory size can be expanded by an option RAM connected by an expansion port (not illustrated).

The RAM 152 is used as an output information rasterization area, an environmental data storage area, and a nonvolatile (NV) RAM. A memory controller (MC) 157 controls access to the external memory 160 such as an HDD or an integrated circuit (IC) card. The external memory 160 stores font data, an emulation program, and form data in addition to the control program.

In an operation panel 159, switches and light-emitting diode (LED) indicators are arranged for operating the printer apparatus 150. The number of external memories 160 is not limited to one, and a plurality of external memories 160 may be connected. For example, option cards and external memories that store programs used to interpret printer control languages of different language systems in addition to internal font data may be connected. Further, an NVRAM (not illustrated) may be connected for storing printer mode setting information from the operation panel 159.

The printer apparatus 150 includes a stapling function for printing the print data in each of a plurality of subsets, binding the printed sheets by stapling, and outputting the sheets according to an instruction from the information processing apparatus 100.

Figure 2:
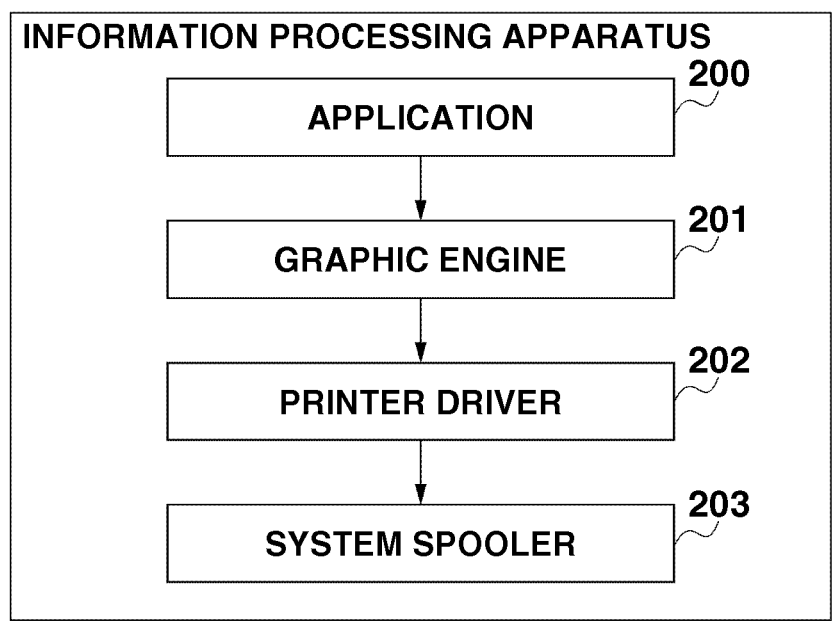
FIG. 2 illustrates a configuration of software for performing a printing process in the printing system.

FIG. 2 illustrates a configuration of the software for performing the printing process in the printing system according to the first exemplary embodiment of the present invention. Referring to FIG. 2, an image generation application 200 generates a print document. Upon printing on the printer apparatus, the application 200 uses a graphic engine 201 to output image data to a printer driver 202.

The graphic engine 201 (corresponding to GDI, i.e., a rendering unit in a Windows® OS (registered trademark of Microsoft Corporation) relays the image data output from the application 200 to the printer driver 202.

The printer driver 202 then generates the print data from the image data received from the graphic engine 201 and outputs the print data to a system spooler 203. The print data is configured of control commands that can be interpreted by a printer.

The system spooler 203 outputs the print data generated by the printer driver 202 to the printer apparatus 150 via the bi-directional interface 130. Such software which is stored in the external memory 111 of the information processing apparatus 100 is loaded onto the RAM 102 when activated and executed by the CPU 101.

Figure 3:
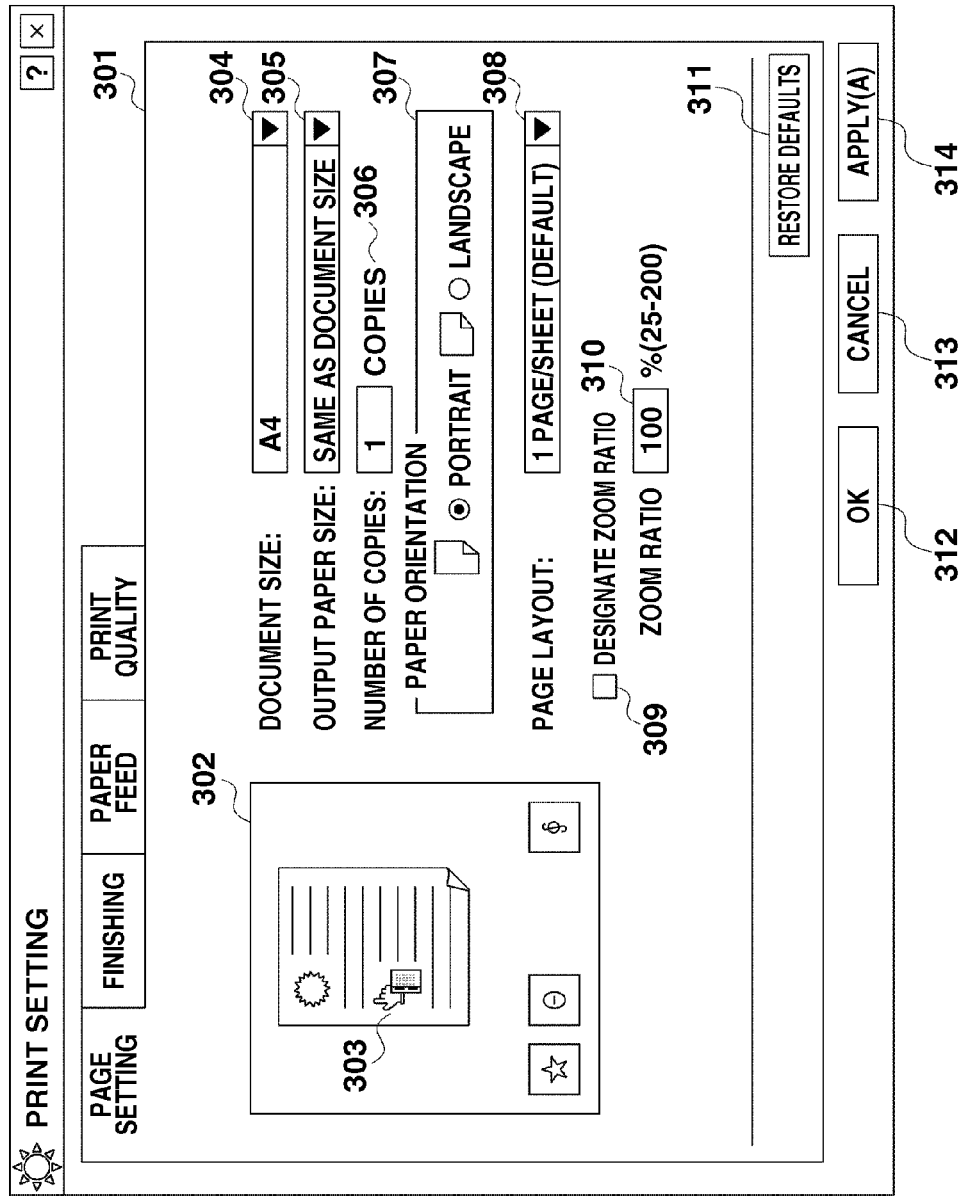
FIG. 3 illustrates a screen displayed when a user has selected a page setting tab on a print setting dialog.

A user interface of the printer driver 202 in the printing system according to the present exemplary embodiment will be described below with reference to FIGS. 3, 4, 5, 6, 7, and 13. FIG. 3 illustrates a screen that is displayed when the user selects a "page setting tab" on the print setting dialog of the printer driver 202. The print setting dialog can be opened from a printer folder managed by the OS or a print setting screen of the application 200.

Referring to FIG. 3, the user can designate print setting parameters of the page setting via a user interface in a page setting sheet 301. More specifically, the page setting sheet 301 includes print setting parameters such as document size 304, output paper size 305, number of copies 306, paper orientation (e.g., portrait and landscape) 307, page layout (e.g., N-up) 308, and zoom ratio designation 309, and zoom ratio 310 for freely designating zooming. For example, the user can designate in the page layout 308 (i.e., a page layout setting unit) the number of pages of the print document to be printed on one sheet. If the user designates "1 page/sheet (default)" and performs printing, one page of the print document is printed on one sheet. Further, if the user designates "2 pages/sheet" and performs printing, two pages of the print document are printed on one sheet.

A preview screen 302 displays an image of a document which is to be actually printed according to the print setting designated by the user. A clickable stapling position setting icon 303 allows the user to set the stapling position on the preview screen 302. If the user moves the mouse cursor to a specific position in the preview screen 302, the mouse cursor changes to the clickable stapling position setting icon 303. There are four types of clickable stapling position setting icons 303, and the icon to be displayed changes according to the position of the mouse cursor.

Figure 13:
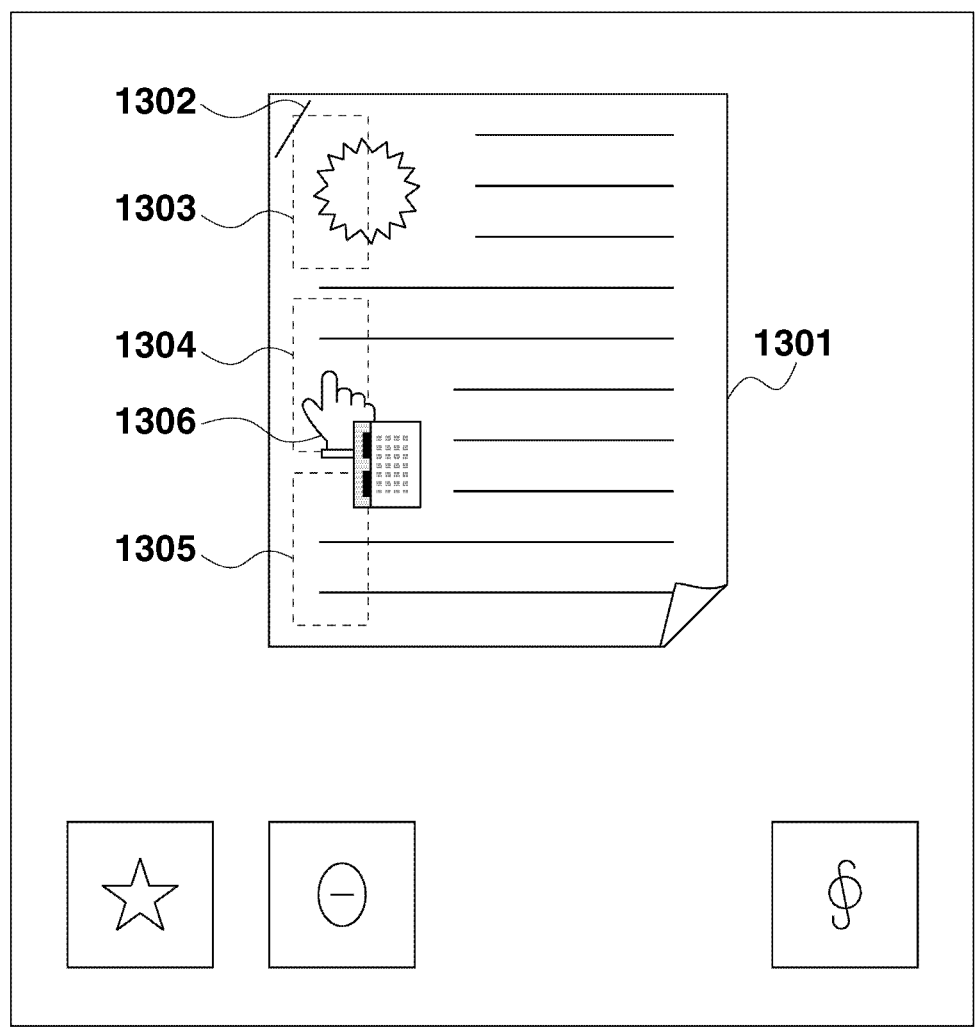
FIG. 13 illustrates an enlarged view of a preview screen.

FIG. 13 is an enlarged view of the preview screen 302 in a case where the user has moved the mouse cursor to the center of the left side of the preview screen 302 when the stapling position is set at the upper left corner (one position).

Referring to FIG. 13, a stapling position in the upper left corner (one position) 1302 is set in a document preview display area 1301. Further, there is an icon switching area for designating no stapling 1303, an icon switching area for designating stapling on the left side (two positions) 1304, and an icon switching area for designating stapling in the lower left corner (one position) 1305. Furthermore, there is a clickable stapling position setting icon 1306 for designating left side stapling (two positions).

If the user moves the mouse cursor to the icon switching area 1303, the clickable stapling position setting icon for designating no stapling is displayed. Similarly, if the user moves the mouse cursor to the icon switching area 1304, the clickable stapling position setting icon for designating stapling on the left side (two positions) is displayed. Further, if the user moves the mouse cursor to the icon switching area 1305, the clickable stapling position setting icon for designating stapling in the lower left corner (one position) is displayed. However, if the user sets different stapling positions for each of a plurality of subsets using a subset position setting dialog to be described below, the clickable stapling position setting icon is not displayed. In another exemplary embodiment, the clickable stapling position setting icon may be caused not to be displayed when the user sets stapling positions to the plurality of subsets using the subset position setting dialog.

Figure 4:
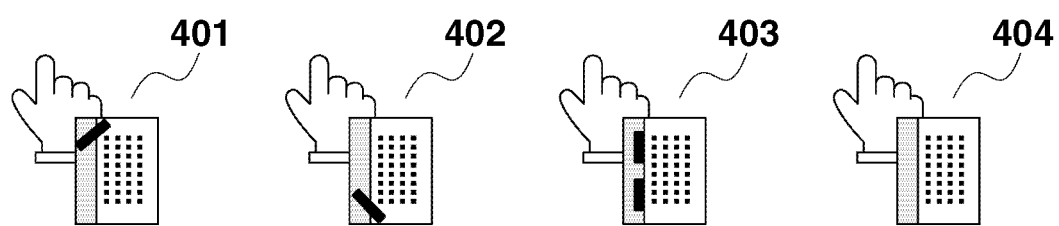
FIG. 4 illustrates types of clickable stapling position setting icons.

FIG. 4 illustrates the types of clickable stapling position setting icons. An icon 401 is used to designate the upper left corner (one position) as the stapling position. An icon 402 is used to designate the lower left corner (one position) as the stapling position. An icon 403 is used to designate the left side (two positions) as the stapling position. An icon 404 is used to designate no stapling. If the user left-clicks the mouse while the clickable stapling position setting icon is displayed, the stapling position corresponding to the type of icon is set.

Returning to FIG. 3, a restore defaults button 311 is used to restore the print settings to a default state. When the user presses an OK button 312, the printer driver confirms the print setting parameters set by the user on the user interface. The printer driver then stores the print setting parameters in a setting information storage area created in the external memory 111 of the information processing apparatus 100 and closes the print setting dialog.

If the user presses a cancel button 313, the printer driver deletes the print setting parameters set by the user on the user interface and closes the print setting dialog of the printer driver. If the user presses an apply button 314, the printer driver confirms the print setting parameters set by the user on the user interface. The printer driver then stores the print setting parameters in the setting information storage area created in the external memory 111 of the information processing apparatus 100.

Figure 5:
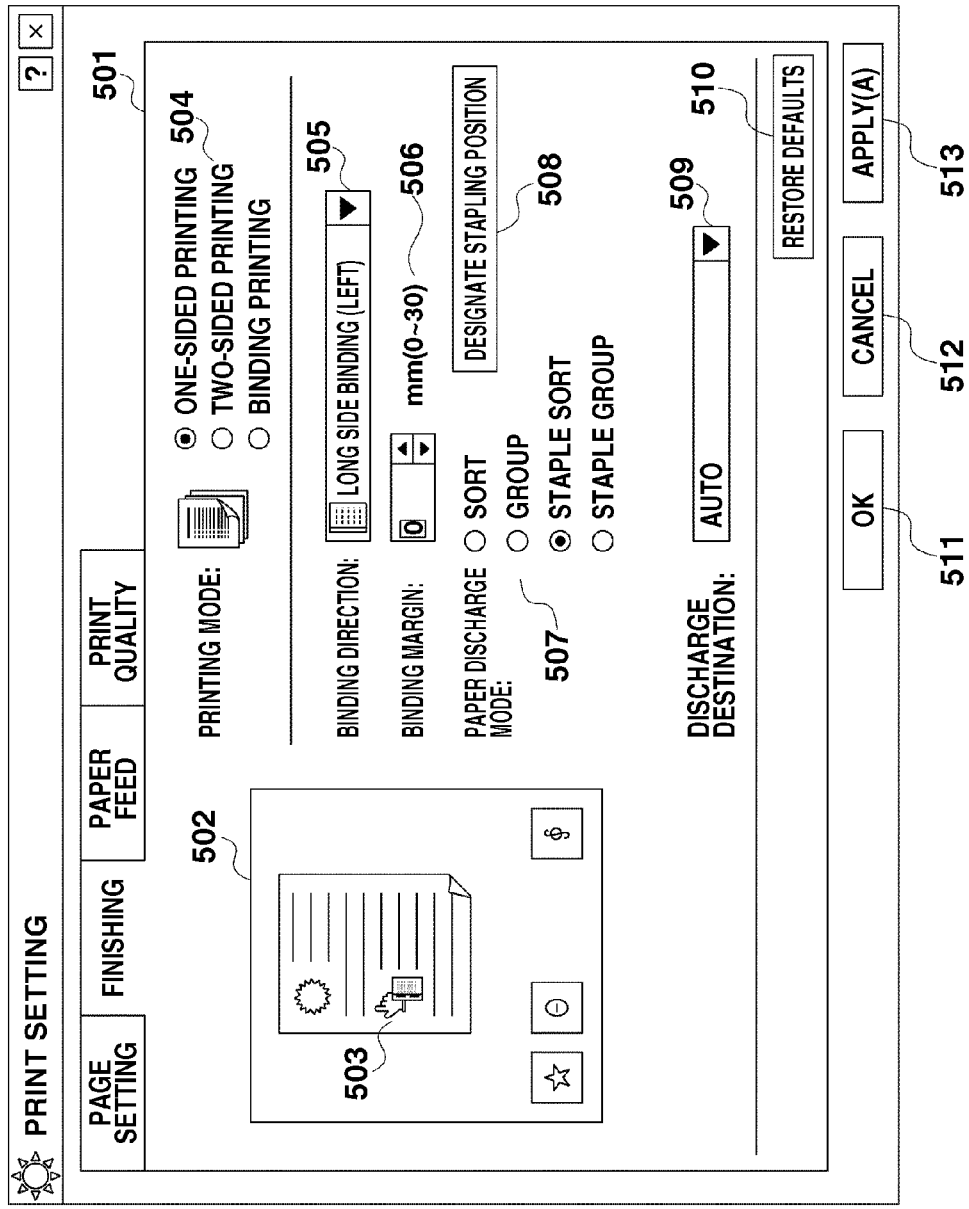
FIG. 5 illustrates a screen displayed when the user selects a finishing setting tab on the print setting dialog.

FIG. 5 illustrates a screen displayed when the user has selected a "finishing setting tab" in the print setting dialog of the printer driver 202. Referring to FIG. 5, the user can designate the print setting parameters related to print finishing via a user interface included in a finishing sheet 501. More specifically, the user can designate printing mode 504, binding direction 505, binding margin 506, paper discharge mode 507, stapling position designation 508, and discharge destination 509. For example, if the user presses a radio button of the paper discharge mode 507, the user can designate one of "sort", "group", "staple sort", and "staple group". If the user then designates "sort" and prints two copies of pages 1 to 3 of the document, the printer apparatus prints pages 1 to 3 in order and then continues to print pages 1 to 3. On the other hand, if the user designates "group" and prints two copies of pages 1 to 3 of the document, the printer apparatus prints two copies of page 1, two copies of page 2, and two copies of page 3. Further, if the user designates "staple sort" and prints a plurality of copies of a plurality of pages of the document, the printer apparatus prints one copy each in the same printing order as "sort", staples the copies, and discharges the printed products. Furthermore, if the user designates "staple group" and prints a plurality of copies of a plurality of pages of the document, the printer apparatus prints one copy each in the same print order as "group", staples the copies, and discharges the printed products.

A preview screen 502 is similar to the preview screen 302 illustrated in FIG. 3, and a clickable stapling position setting icon 503 is similar to the clickable stapling position setting icon 303. Further, a restore defaults button 510, an OK button 511, a cancel button 512, and an apply button 513 are similar to the restore defaults button 311, the OK button 312, the cancel button 313, and the apply button 314 illustrated in FIG. 3. If the user selects "sort" or "group" by pressing the radio button of the paper discharge mode 507 in the finishing sheet 501, the stapling position designation button 508 becomes invalid. On the other hand, if the user selects "staple sort" or "staple group" by pressing the radio button of the paper discharge mode 507, the stapling position designation button 508 becomes valid. If the user then presses the stapling position designation button 508, a stapling position designation dialog illustrated in FIG. 6 is displayed.

Figure 6:
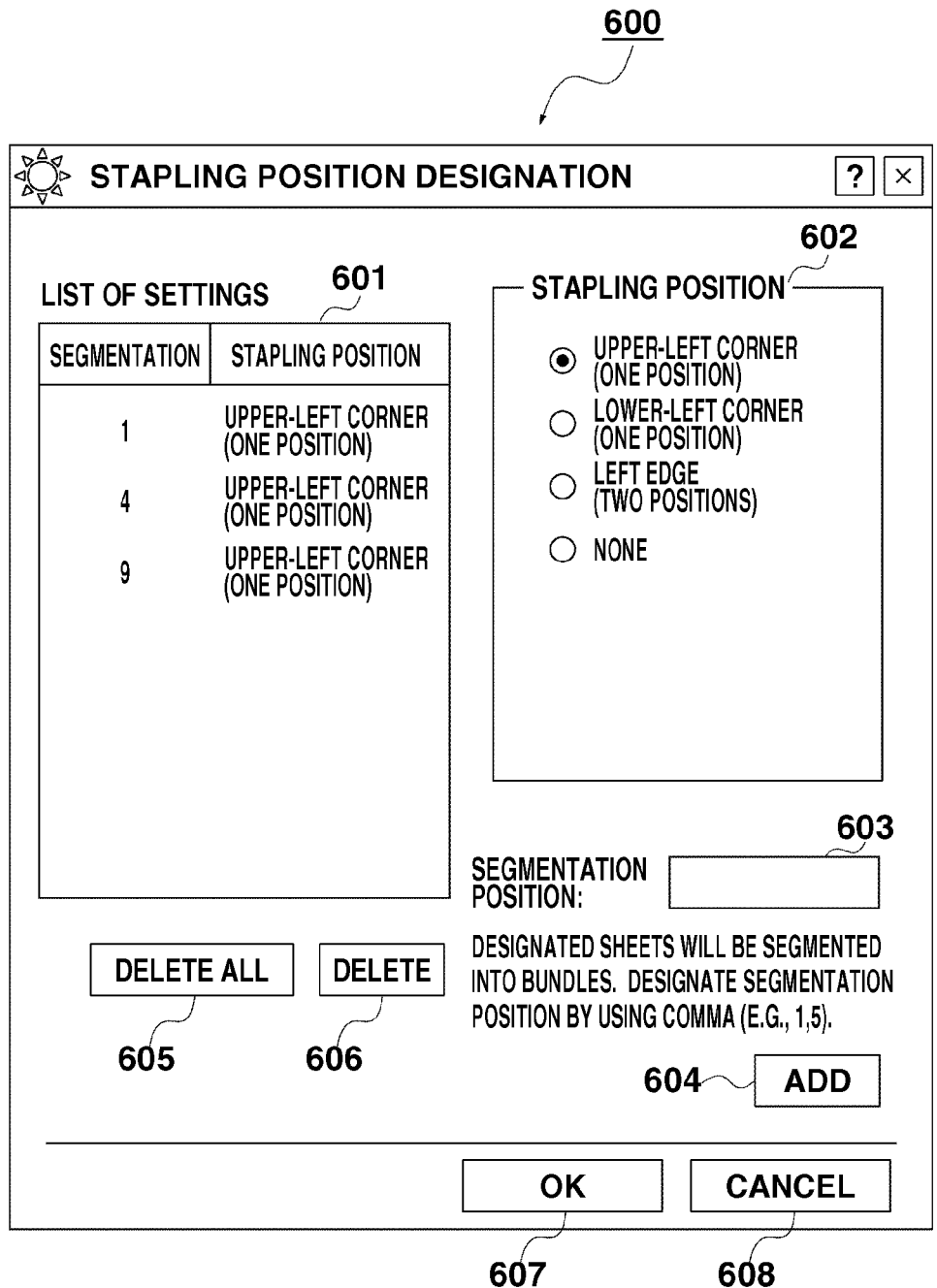
FIG. 6 illustrates a stapling position designation dialog.

FIG. 6 illustrates a display screen of the stapling position designation dialog (i.e., a subset staple setting unit). Referring to FIG. 6, a setting list display area 601 displays "stapling segmentation position" and "stapling position", i.e., staple setting information. If the user selects "staple group" in the paper discharge mode 507 and presses the stapling position designation button 508 illustrated in FIG. 5, the word "segmentation" in the setting list display area 601 becomes grayed out, and the segmentation positions are not displayed.

There are four stapling position setting radio buttons 602, i.e., "upper left corner (one position)", "lower left corner (one position)", "left side (two positions)", and "none". The user can designate one of the stapling positions by pressing the radio button.

The user can input a number in a segmentation position designation text box 603 to designate the stapling segmentation position. If the user selects "staple group" in the paper discharge mode 507 and presses the stapling position designation button 508, the segmentation position designation text box 603 becomes invalid.

The user presses an add button 604 after designating the stapling position using the stapling position setting radio buttons 602 and the stapling segmentation position in the segmentation position designation text box 603. By such an operation, the designated segmentation position and stapling position are displayed in the setting list display area 601 as the staple setting information.

If the user presses a delete all button 605, all of the staple setting information displayed in the setting list display area 601 is deleted. If the user presses a delete button 606 after selecting one of the staple setting information displayed in the setting list display area 601, the selected staple setting information is deleted.

If the user presses an OK button 607 while the staple setting information is displayed in the setting list display area 601, the displayed staple setting information is converted and stored in a staple setting management table illustrated in FIG. 7. If the user presses a cancel button 608, the stapling position designation dialog is closed.

FIG. 7 illustrates the staple setting management table stored in the setting information storage area created by the printer driver in the external memory 111 of the information processing apparatus 100. Referring to FIG. 7, the staple setting management table stores four types of information as one set with respect to one staple setting information. The four types of information include a subset number 701, a subset top page number 702, a number of staples 703, and a stapling position 704. According to the present exemplary embodiment, ten sets of staple setting information can be stored in the staple management table.

A process for setting the staple information in the printer driver will be described below with reference to FIGS. 6, 7, and 10.

Figure 10:
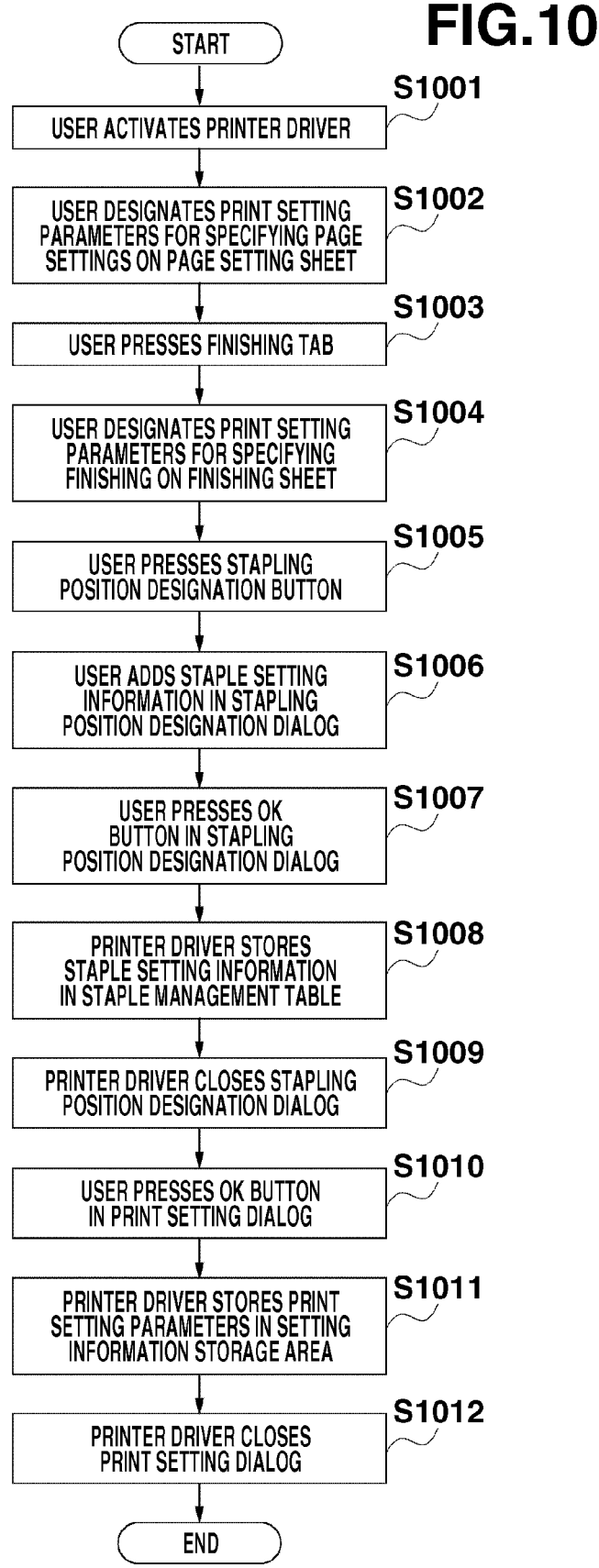
FIG. 10 is a flowchart illustrating a staple information setting process.

FIG. 10 is a flowchart illustrating a staple information setting process. In step S1001, the user activates the printer driver from a printer folder managed by the OS or an application. The CPU 101 then reads from the external memory 111 and loads onto the RAM 102 the printer driver and executes a program. The print setting dialog illustrated in FIG. 3 is thus displayed on the CRT 110. In step S1002, the user designates the print setting parameters via the user interface included in the page setting sheet. For example, the user designates document size: A4, output paper size: same as document size, number of copies: 1, paper orientation: portrait, page layout: 1 page/sheet (default), zoom ratio designation: no, and zoom ratio: 100%.

In step S1003, the user presses the finishing tab, so that the print setting dialog illustrated in FIG. 4 is displayed. In step S1004, the user designates the print setting parameters via the user interface included in the finishing sheet. More specifically, the user designates print setting: one-side printing, binding direction: long side binding, binding margin: 0 mm, paper discharge mode: staple sort, and discharge destination: auto. If the user designates "staple sort" as the paper discharge mode, the stapling position setting button 508 becomes valid.

In step S1005, the user presses the stapling position setting button 508, so that the stapling position designation dialog illustrated in FIG. 6 is displayed. In step S1006, the user then designates the staple setting information via the user interface included in the stapling position designation dialog. For example, the user selects "upper left corner (one position)" using the stapling position setting radio button 602, inputs a character string "1,4,9" in the segmentation position designation text box 603, and presses the add button 604. The staple setting information as illustrated in the setting list display area 601 in FIG. 6 is thus displayed. This indicates that pages 1 to 3 are stapled as one subset in the upper left corner (one position), pages 4 to 8 are stapled as one subset in the upper left corner (one position), and page 9 and following pages are stapled as one subset in the upper left corner (one position).

In step S1007, the user presses the OK button 607 in the stapling position designation dialog. In step S1008, the printer driver then stores the staple setting information in the staple management table as illustrated in FIG. 7. In other words, the printer driver stores "subset top page number: 1, number of staples: 1, stapling position: upper left corner" in the area of staple number 1. Further, the printer driver stores "subset top page number: 4, number of staples: 1, stapling position: upper left corner" in the area of subset number 2, and "subset top page number: 9, number of staples: 1, stapling position: upper left corner" in the area of subset number 3. No information is stored in the areas of subset numbers 4, 5, 6, 7, 8, 9, and 10.

In step S1009, the printer driver closes the stapling position designation dialog. In step S1010, the user presses the OK button in the print setting dialog. In step S1011, the printer driver then stores the print parameters designated by the user in the setting information storage area created in the external memory 111 of the information processing apparatus 100.

In step S1012, the printer driver closes the print setting dialog, and the process ends. For example, if the printer apparatus prints 12 pages of a document 901 illustrated in FIG. 9 when the user has designated "1 page/sheet (default)" in the page layout 308 and has set the staple setting information as illustrated in FIG. 7, the printer driver generates print data illustrated in FIG. 8.

Figure 9:
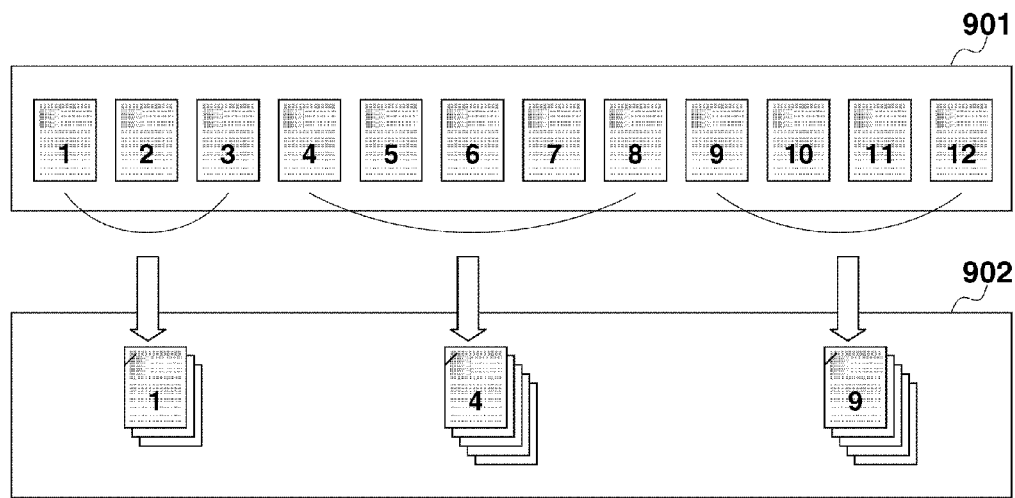
FIG. 9 illustrates a relation between a print document and a final printed product.

FIG. 8 illustrates an example of the print data the printer driver transmits to the printer apparatus 150 according to the present exemplary embodiment. FIG. 9 illustrates a relation between the print document and the final print product from the printer apparatus.

Referring to FIG. 8, the print data includes a print execution command 801, a subset 1 print command 802, a subset 2 print command 803, and a subset 3 print command 804. The subset print command includes a subset top page number, staple information of the subset, and image data included in the subset.

The print execution command 801 is a command for printing according to the following parameters, i.e., output paper size: A4, number of copies: 1 copy, paper orientation: portrait, zoom ratio: 100%, printing mode: one-sided printing, binding direction: long side binding (left), binding margin: 0 mm, paper discharge mode: staple sort, number of subsets: 3, and discharge destination: auto.

The subset 1 print command 802 is a command for printing according to the following parameters, i.e., subset top page number applied to the subset 1: 1, number of staples applied to the subset 1: 1, stapling position applied to the subset 1: upper left corner, and image data included in the subset 1: image data of pages 1 to 3 of the print document.

The subset 2 print command 803 is a command for printing according to the following parameters, i.e., subset top page number applied to the subset 2: 4, number of staples applied to the subset 2: 1, stapling position applied to the subset 2: upper left corner, and image data included in the subset 2: image data of pages 4 to 8 of the print document.

The subset 3 print command 804 is a command for printing according to the following parameters, i.e., subset top page number applied to the subset 3: 9, number of staples applied to the subset 3: 1, stapling position applied to the subset 3: upper left corner, and image data included in the subset 3: image data of pages 9 to 12 of the print document.

If the above-described print data is then output to the printer apparatus, the printer apparatus outputs a final print product 902 as illustrated in FIG. 9. More specifically, pages 1 to 3 of the 12 pages of the print document 901 is printed as one subset and stapled in the upper left corner (one position). Pages 4 to 8 of the print document 901 is then printed as one subset and stapled in the upper left corner (one position), and pages 9 to 12 of the print document 901 is printed as one subset and stapled in the upper left corner (one position). The subsets are then output as the final print product 902.

Figure 11:
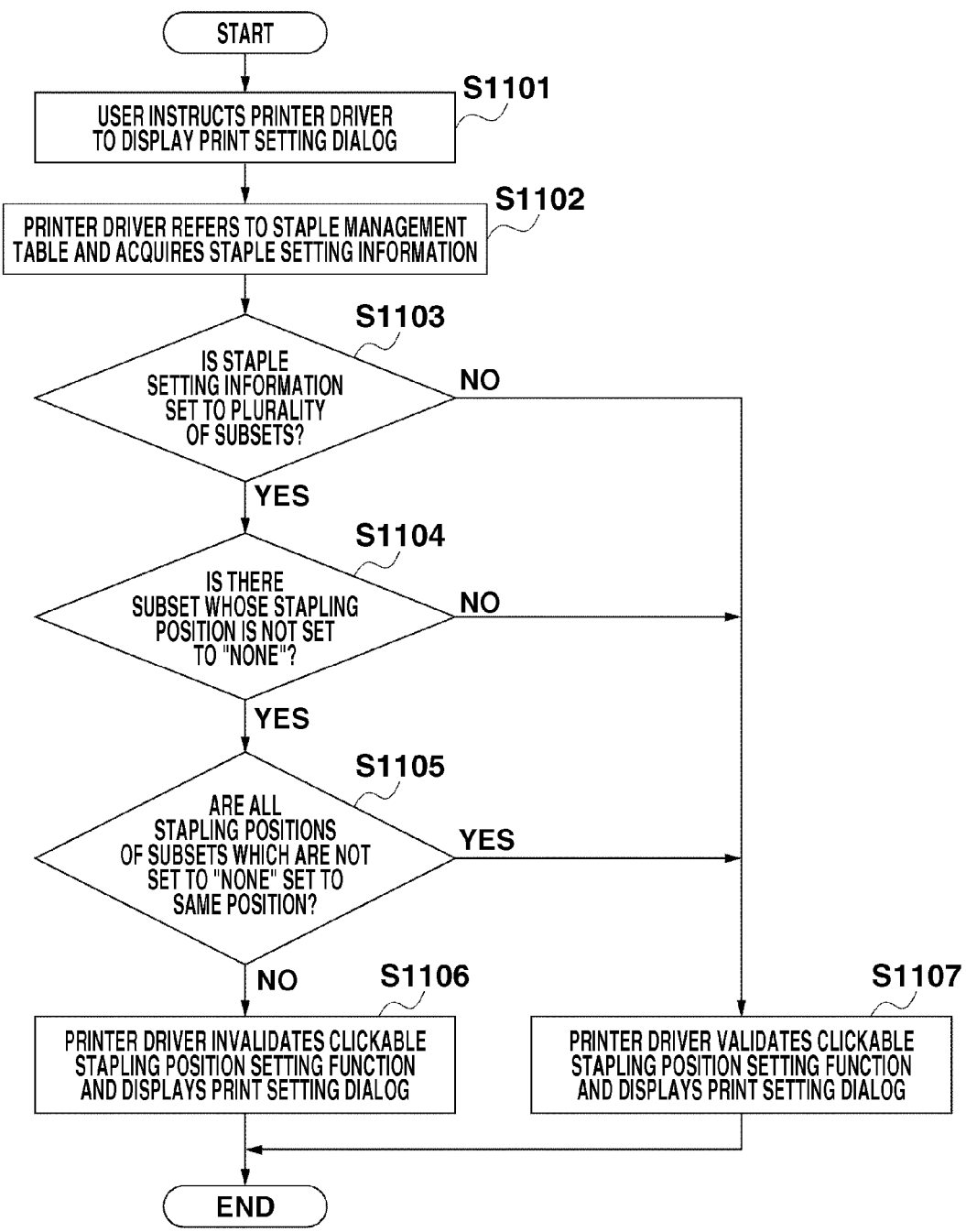
FIG. 11 is a flowchart illustrating a process performed by a printer driver.

A process for controlling validation and invalidation of the clickable stapling position setting function of the printer driver will be described below with reference to FIG. 11. FIG. 11 is a flowchart illustrating a process performed by the printer driver.

In step S1101, the user activates the printer driver, and the print setting dialog of the printer dialog is displayed. In step S1102, the printer driver refers to the staple setting management table and acquires the staple setting information, i.e., the subset top page number, the number of staples, and the stapling position associated with the staple number.

In step S1103, the printer driver determines whether the staple setting information is set to a plurality of subsets. More specifically, if there is a subset top page associated with a subset number for a plurality of the subset numbers, the printer driver determines that the staple setting information is set to the plurality of subsets. If the printer driver determines that the staple setting information is set to a plurality of subsets (YES in step S1103), the process proceeds to step S1104. On the other hand, if the printer driver determines that the staple setting information is not set to a plurality of subsets (NO in step S1103), the process proceeds to step S1107. If the staple setting information is set to three subsets as illustrated in FIG. 7 according to the present exemplary embodiment, the process proceeds to step S1104.

In step S1104, the printer driver determines whether there is a subset whose stapling position is not set to "none". If there is a subset whose stapling position is not set to "none" (YES in step S1104), the process proceeds to step S1105. If there is no subset whose stapling position is not set to "none" (NO in step S1104), the process proceeds to step S1107. If the stapling position "upper left corner" is set as in the three subsets illustrated in FIG. 7 according to the present exemplary embodiment, the process proceeds to step S1105.

In step S1105, the printer driver determines whether the stapling positions set to the subsets in which the stapling position is set to a position other than "none" are all the same. More specifically, the printer driver determines that the stapling positions are the same if the stapling positions associated with each of the subset numbers are the same and other than "none", and the numbers of staples are the same, i.e., there is only one type of stapling position setting. If the printer driver determines that the stapling positions set to the subsets in which the stapling position is set to a position other than "none" are all the same (YES in step S1105), the process proceeds to step S1107. On the other hand, if the printer driver determines that the stapling position set to one of the subsets is different (NO in step S1105), the process proceeds to step S1106. If the stapling positions are all "upper-left corner" and the number of staples is "1" as in the three subsets illustrated in FIG. 7 according to the present exemplary embodiment, the process proceeds to step S1107.

In step S1106, i.e., if a plurality of stapling positions is set, the printer driver displays the print setting dialog while invalidating the clickable stapling position setting function, and the process ends. In step S1107, the printer driver displays the print setting dialog while validating the clickable stapling position setting function, and the process ends.

Figure 12:
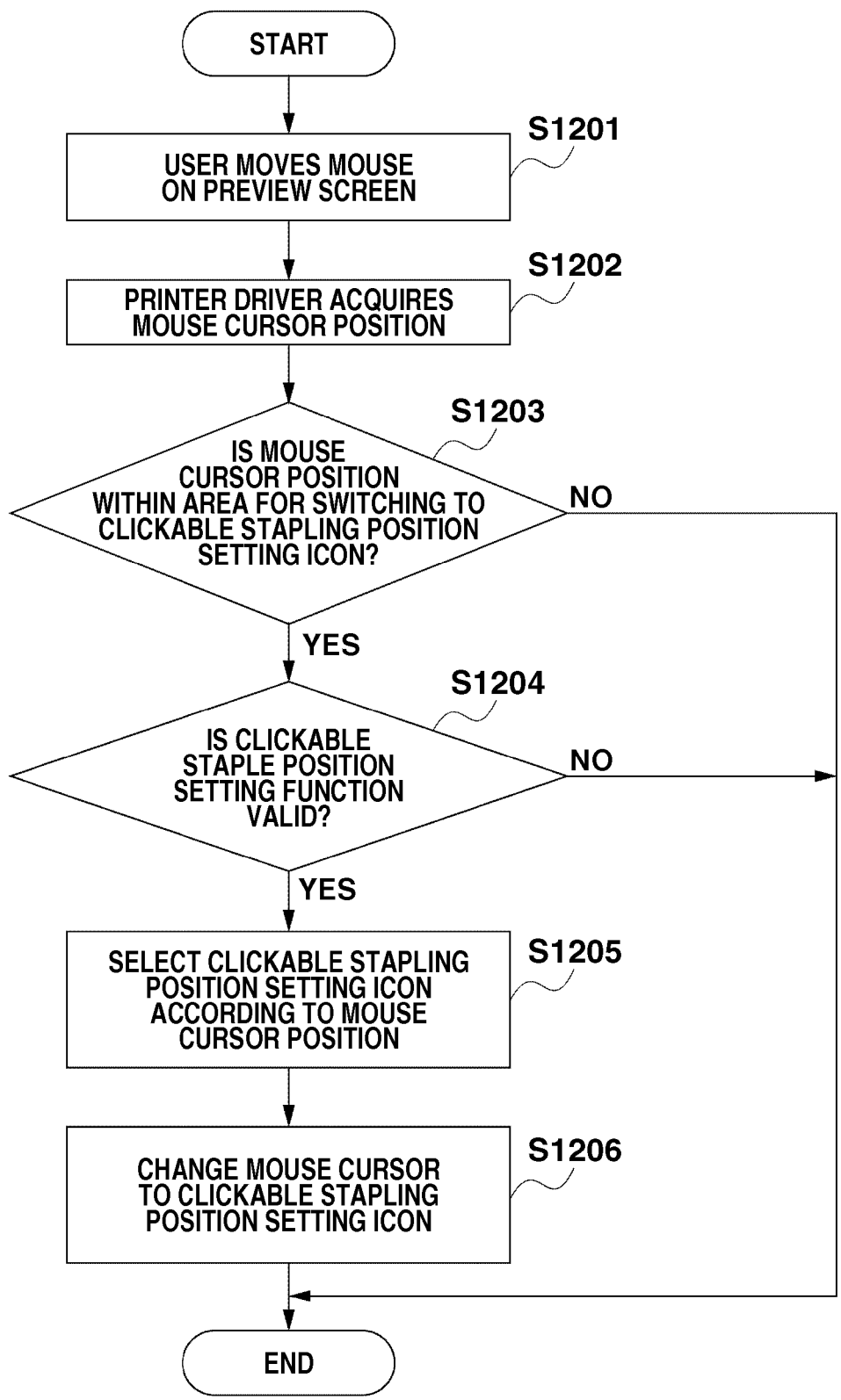
FIG. 12 is a flowchart illustrating a process performed by a printer driver.

The clickable stapling position setting process performed by the printer driver will be described below with reference to FIGS. 12 and 13. FIG. 12 is a flowchart illustrating a process performed by the printer driver.

In step S1201, the user moves the mouse cursor on the preview screen of the printer driver as illustrated in FIG. 13. In step S1202, the printer driver then acquires the position of the mouse cursor.

In step S1203, the printer driver determines whether the acquired mouse cursor position is within the area for switching to the clickable stapling position setting icon. If the printer driver determines that the mouse cursor position is within the area for switching to the clickable stapling position setting icon (YES in step S1203), the process proceeds to step S1204. In step S1204, the printer driver determines whether the clickable stapling position setting function is valid. If the printer driver determines that the clickable stapling position setting function is valid (YES in step S1204), the process proceeds to step S1205. In step S1205, the printer driver selects the clickable stapling position setting icon according to the position of the mouse cursor.

In step S1206, the printer driver changes the mouse cursor to the clickable stapling position setting icon, and the process ends.

On the other hand, if the printer driver determines that the mouse cursor position is not within the area for switching to the clickable stapling position setting icon (NO in step S1203), the process ends without the printer driver displaying the clickable stapling position setting icon. Further, if the printer driver determines that the clickable stapling position setting function is invalid (NO in step S1204), the process ends without the printer driver displaying the clickable stapling position setting icon.

Figure 14:
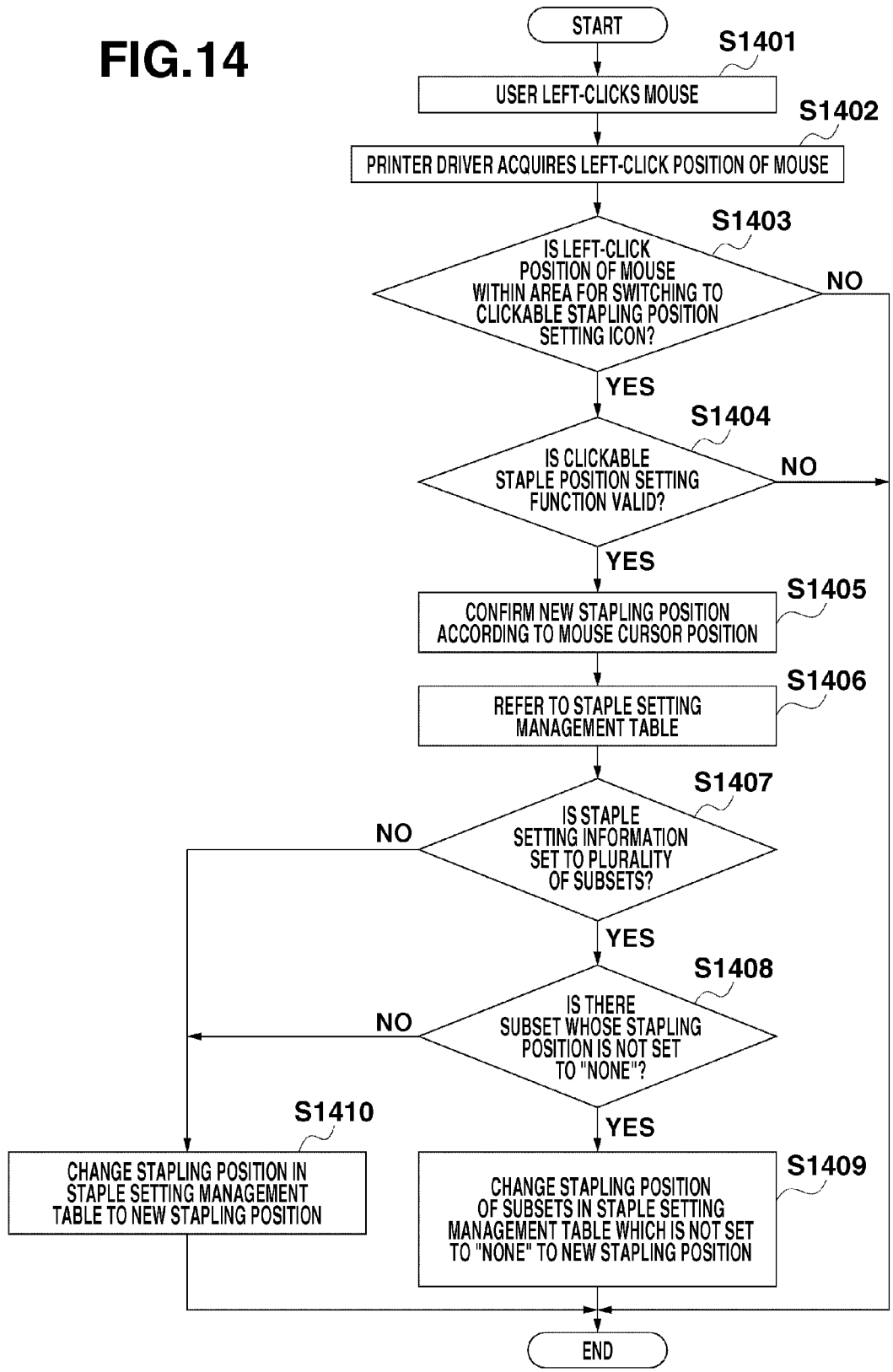
FIG. 14 is a flowchart illustrating a clickable staple information setting process.

The clickable staple information setting process performed by the printer driver will be described below with reference to FIG. 14. FIG. 14 is a flowchart illustrating the clickable staple information setting process.

In step S1401, the user left-clicks the mouse while the clickable stapling position setting icon is displayed on the preview screen. In step S1402, the printer driver then acquires the position at which the user has left-clicked the mouse.

In step S1403, the printer driver determines whether the acquired left click position is within the area for switching to the clickable stapling position setting icon. If the printer driver determines that the acquired left click position is within the area for switching to the clickable stapling position setting icon (YES in step S1403), the process proceeds to step S1404. In step S1404, the printer driver determines whether the clickable stapling position setting function is valid. If the printer driver determines that the clickable stapling position setting function is valid (YES in step S1404), the process proceeds to step S1405. In step S1405, the printer driver sets the staple setting information according to the position where the user left-clicked the mouse.

For example, if the user left-clicks the mouse within the icon switching area 1303 in the example illustrated in FIG. 13 according to the present exemplary embodiment, "no stapling" is set as the staple setting information. Similarly, if the user left-clicks the mouse within the icon switching area 1304, stapling in the left side (two positions) is set, and if the user left-clicks the mouse within the icon switching area 1305, stapling in the lower left corner (one position) is set.

In step S1406, the printer driver refers to the staple setting management table illustrated in FIG. 7. In step S1407, the printer driver then determines whether the staple setting information is set to a plurality of subsets. If the printer driver determines that the staple setting information is set to a plurality of subsets (YES in step S1407), the process proceeds to step S1408. In step S1408, the printer driver determines whether there is a subset whose stapling position is not set to "none". If the printer driver determines that there is a subset whose stapling position is not set to "none" (YES in step S1408), the process proceeds to step S1409.

In step S1409, the printer driver updates the staple setting information of the subset whose stapling position is not set to "none" in the staple setting management table to the staple setting information set in step S1405. The process then ends. The setting information of the subset whose stapling position is set to "none" is maintained.

On the other hand, if the printer driver determines that the staple setting information is not set to a plurality of subsets (NO in step S1407), or that there is no subset whose stapling position is not set to "none" (NO in step S1408), the process proceeds to step S1410. In step S1410, the printer driver sets the staple setting information confirmed in step S1405 to the staple setting management table, and the process ends.

If the printer driver determines that the acquired left-click position is not within the area for switching to the clickable stapling position setting icon (NO in step S1403), the process ends. Further, if the printer driver determines that the clickable stapling position setting function is not valid (YES in step S1404), the process ends.

Figure 15B:
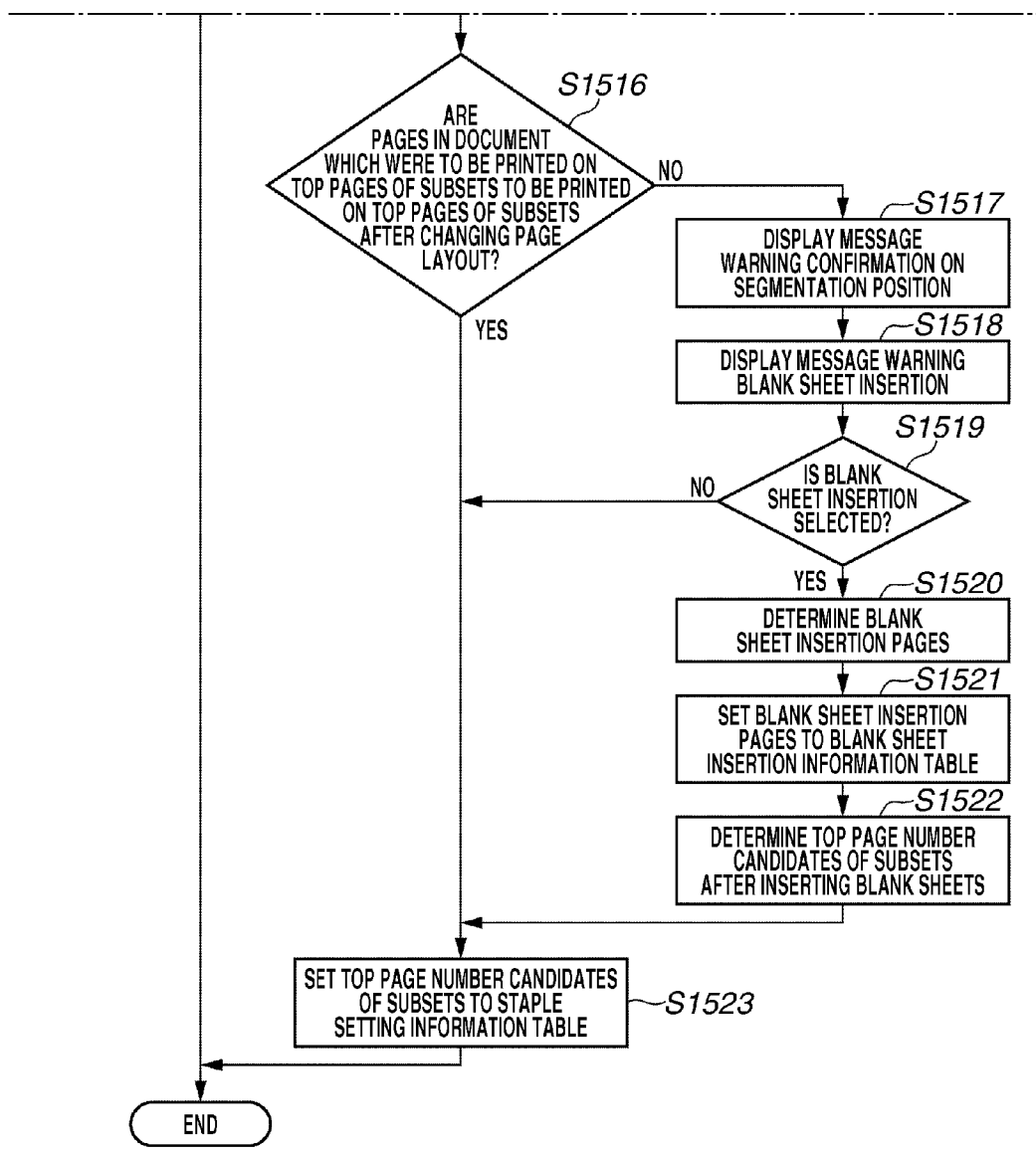
FIG. 15, composed of FIGS. 15A and 15B, is a flowchart illustrating a staple information adjustment process.

The process of adjusting the staple information when the page layout is changed by the printer driver while the staple information is set to the subsets will be described below with reference to FIGS. 15, 16, 17, 18, 19, and 20. FIG. 15, composed of FIGS. 15A and 15B, is a flowchart illustrating the staple information adjustment process. According to the present exemplary embodiment, "1 page/sheet (default)" designated in the page layout 308 illustrated in FIG. 3 is changed to "2 pages/sheet" while the staple setting information is set as illustrated in FIG. 7.

In step S1501, the user activates the printer driver from the printer folder managed by the OS or an application, and the CPU 101 reads the printer driver from the external memory 111, loads the printer driver onto the RAM 102, and executes a program. The CRT 110 then displays the print setting dialog illustrated in FIG. 3. In step S1502, the user changes the page layout setting in the page setting sheet 301 from "1 page/sheet (default)" to "2 pages/sheet".

In step S1503, the printer driver refers to the staple management table and acquires the staple setting information. In step S1504, the printer driver determines whether the staple setting information is set to a plurality of subsets. If the printer driver determines that the staple setting information is set to a plurality of subsets (YES in step S1504), the process proceeds to step S1505. If the printer driver determines that the staple setting information is not set to a plurality of subsets (NO in step S1504), the process ends. Since the staple setting information is set to three subsets as illustrated in FIG. 7 according to the present exemplary embodiment, the process proceeds to step S1505.

In step S1505, the printer driver acquires the subset top page numbers that are set before the page layout is changed. According to the present exemplary embodiment, page 1, page 4, and page 9 are acquired. In step S1506, the printer driver then refers to a blank sheet insertion information table. In step S1507, the printer driver determines whether pages in which the blank sheet is to be inserted are registered. If the printer driver determines that the pages in which the blank sheet is to be inserted are registered (YES in step S1507), the process proceeds to step S1508. If the printer driver determines that pages in which the blank sheet is to be inserted are not registered (NO in step S1507), the process proceeds to step S1513. Since pages in which the blank sheet is to be inserted are not registered according to the present exemplary embodiment, the process proceeds to step S1513.

In step S1513, the printer driver calculates the page numbers of the print document which were to be printed on the subset top page before changing the page layout. More specifically, the page numbers are calculated using the equation described below.

"Page number of the print document to be printed on the subset top page"=(subset top page number−1)×(number of pages to be printed on one sheet set in the page layout)+1.

According to the present exemplary embodiment, the subset top page numbers before changing the page layout are page 1, page 4, and page 9. Since the number of pages to be printed on one sheet set in the page layout is 1, the equation becomes as follows.

$(1-1)*1+1=1$ $(4-1)*1+1=4$ $(9-1)*1+1=9$

As a result, page 1, page 4, and page 9 are calculated.

In step S1514, the printer driver calculates the subset top page number candidates after changing the page layout. More specifically, the printer driver calculates using the equation described below.

In a case where the number of pages to be printed on one sheet set in the page layout is 1:
"Subset top page number candidate after changing the page layout"="page number of the printed document which was to be printed on the subset top page before changing the page layout".

In a case where the number of pages to be printed on one sheet set in the page layout is 2 or greater:
"Subset top page number candidate after changing the page layout"=(page number of the printed document which was to be printed on the subset top page before changing the page layout)/(number of pages to be printed on one sheet set in the page layout (round down decimals))+1.

According to the present exemplary embodiment, the subset top page numbers before changing the page layout are page 1, page 4, and page 9. Since the number of pages to be printed on one sheet set in the page layout is 2, the equation becomes as follows.

$1/2+1=1$ $4/2+1=3$ $9/2+1=5$

As a result, page 1, page 3, and page 5 are calculated as the subset top page number candidates after changing the page layout.

In step S1515, the printer driver calculates the page numbers of the print document to be printed on the subset top page candidates. The equation is the same as the equation used in step S1513. According to the present exemplary embodiment, the subset top page numbers after changing the page layout are page 1, page 3, and page 5. Since the number of pages to be printed on one sheet set in the page layout is 2, the equation becomes as follows.

$(1-1)*2+1=1$ $(3-1)*2+1=5$ $(5-1)*2+1=9$

As a result, page 1, page 5, and page 9 are calculated as the page numbers of the print document to be printed on the subset top page candidates.

In step S1516, the printer driver determines whether the pages of the print document which were to be printed on the subset top pages will be printed on the subset top pages after changing the layout. More specifically, if all of the page numbers of the print document calculated in step S1513 are included in the page numbers of the print document calculated in step S1515, the printer driver determines that the pages will continue to be printed on the subset top pages after changing the layout. If the printer driver determines that the pages will continue to be printed on the subset top pages after changing the layout (YES in step S1516), the process proceeds to step S1523. In step S1523, the printer driver sets the subset top page number candidates to the staple setting information table. On the other hand, if the printer driver determines that the pages will not to be printed on the subset top pages after changing the layout (NO in step S1516), the process proceeds to step S1517. According to the present exemplary embodiment, the page numbers calculated in step S1513 are page 1, page 4, and page 9, and in step S1515 are page 1, page 5, and page 9. The process thus proceeds to step S1517.

Figure 19A:
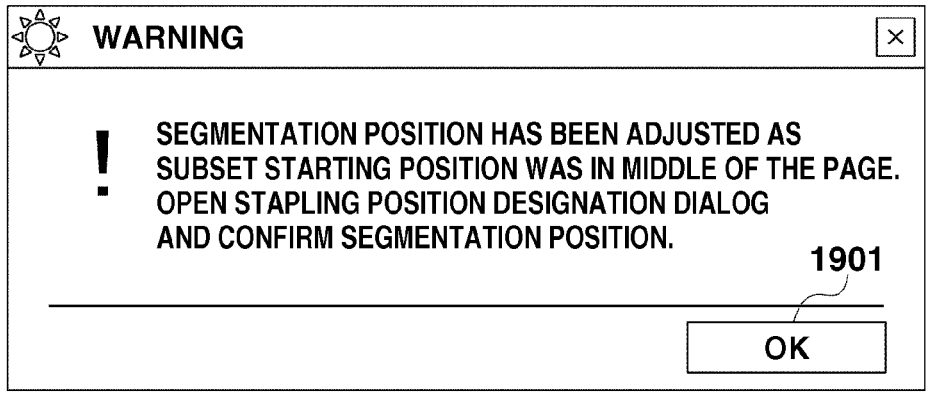
FIGS. 19A, 19B, and 19C illustrate warning messages.
Figure 19B:
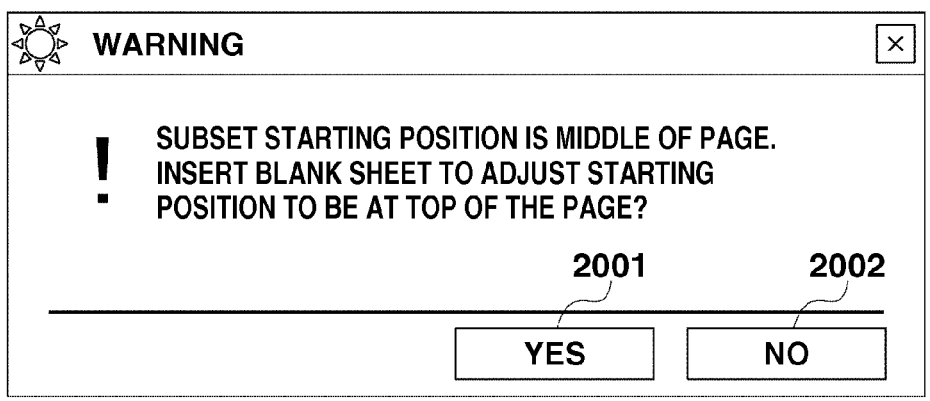

In step S1517, the printer driver displays a warning message to the user as illustrated in FIG. 19A to confirm the segmentation positions. If the user then presses an OK button 1901, the process proceeds to step S1518. In step S1518, the printer driver displays a message as illustrated in FIG. 19B for confirming the user on whether to insert a blank sheet. The process then proceeds to step S1519. If the user presses a NO button 2002 illustrated in FIG. 19B, the printer driver determines that the user has not selected inserting the blank sheet (NO in step S1519), and the process proceeds to step S1523. In step S1523, the printer driver sets the subset top page number candidates to the staple setting information table. According to the present exemplary embodiment, the printer driver sets page 1, page 3, and page 5 as the subset top page number candidates to the staple setting information table as illustrated in FIG. 20. In FIG. 20, four types of information 2201 to 2204 are similar to those 701 to 704 illustrated in FIG. 7. On the other hand, if the user presses a YES button 2001 illustrated in FIG. 19B, the printer driver determines that the user has selected inserting the blank sheet (YES in step S1519). The process then proceeds to step S1520.

Figure 17:
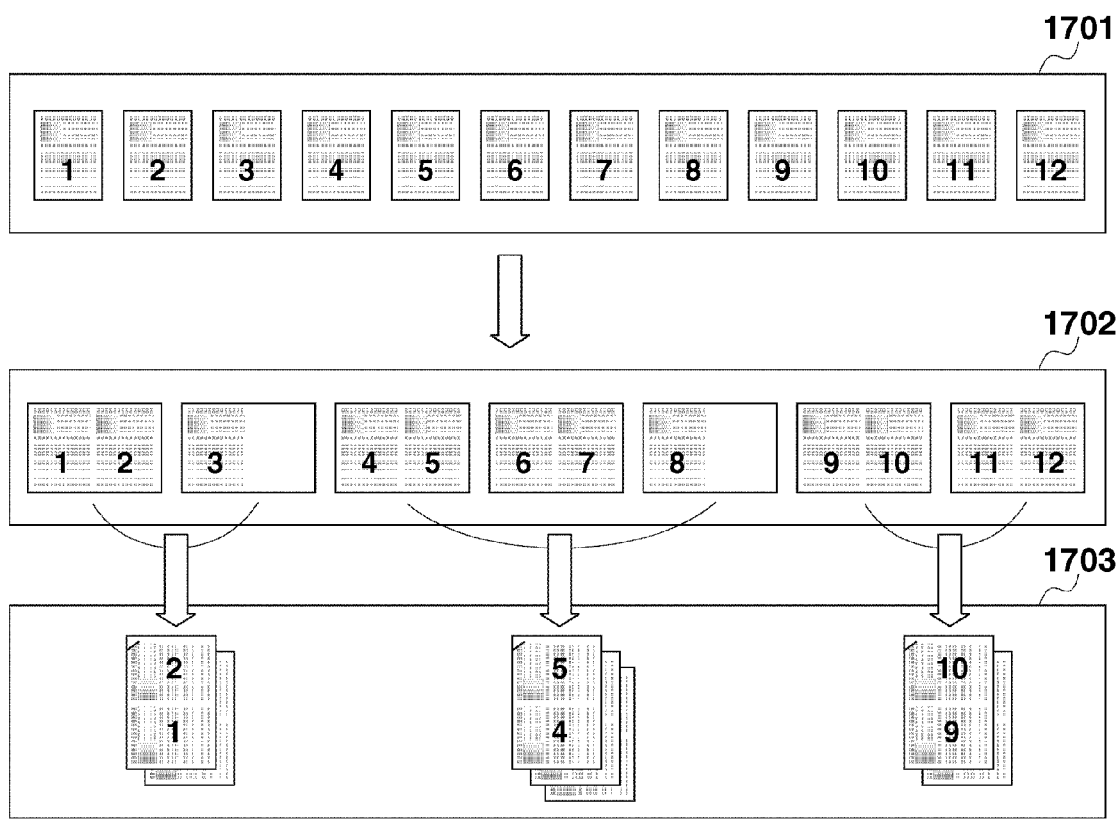
FIG. 17 illustrates a relation between a print document and a final printed product.

In step S1520, the printer driver determines to insert the blank sheet. According to the present exemplary embodiment, the printer driver determines to insert the blank sheets so that pages 1, 4, and 9 of the printed document are printed on the subset top pages even after changing the page layout. As a result, a final print product 1703 as illustrated in FIG. 17 is acquired. In other words, the printer driver determines to insert a blank sheet subsequent to page 3 and a blank sheet subsequent to page 8 as illustrated in subsets 1702.

Figure 18:
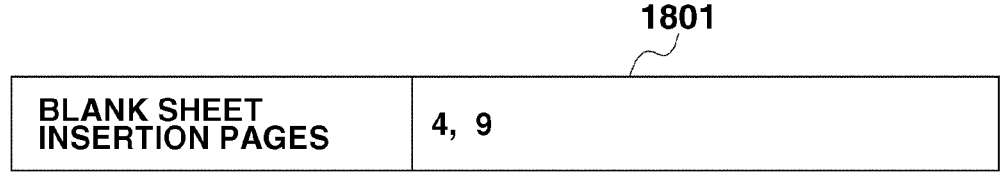
FIG. 18 illustrates a blank sheet information table.

In step 1521, the printer driver sets the pages in which blank sheets will be inserted in the blank sheet insertion information table illustrated in FIG. 18. The blank sheet insertion information table is created inside the setting information storage area of the external memory 111 in the information processing apparatus 100. Since the blank sheets are inserted subsequent to page 3 and page 8 according to the present exemplary embodiment, "4" and "9" are set in a blank sheet insertion page storage area 1801 illustrated in FIG. 18.

In step S1522, the printer driver determines the subset top page number candidates after inserting the blank sheets. According to the present exemplary embodiment, the subset top page number candidates thus become page 1, page 3, and page 6 as illustrated in the subsets 1702 and the final print product 1703 in FIG. 17.

In step S1523, the printer driver sets the subset top page number candidates to the staple setting information table. According to the present exemplary embodiment, the subset top page number candidates, i.e., page 1, page 3, and page 6 are set to the staple setting information table as illustrated in FIG. 21. In FIG. 21, four types of information 2301 to 2304 are similar to those 701 to 704 illustrated in FIG. 7.

A process performed when the user changes the page layout from "2 pages/sheet" to "1 page/sheet (default)" on the page layout 308 while the staple setting information is set as illustrated in FIG. 21 will be described below.

In step S1501, the user activates the printer driver from the printer folder managed by the OS or an application, and the CPU 101 reads the printer driver from the external memory 111, loads the printer driver onto the RAM 102, and executes a program. The CRT 110 then displays the print setting dialog illustrated in FIG. 3. In step S1502, the user changes the page layout setting in the page setting sheet 301 from "2 pages/sheet" to "1 page/sheet (default)".

In step S1503, the printer driver refers to the staple management table and acquires the staple setting information. In step S1504, the printer driver determines whether the staple setting information is set to a plurality of subsets. If the printer driver determines that the staple setting information is set to a plurality of subsets (YES in step S1504), the process proceeds to step S1505. If the printer driver determines that the staple setting information is not set to a plurality of subsets (NO in step S1504), the process ends. Since the staple setting information is set to three subsets as illustrated in FIG. 21. According to the present exemplary embodiment, the process proceeds to step S1505.

In step S1505, the printer driver acquires the subset top page number before changing the page layout. According to the present exemplary embodiment, page 1, page 3, and page 6 are acquired.

In step S1506, the printer driver refers to the blank sheet insertion information table and determines whether pages in which the blank sheet is to be inserted are registered. If the printer driver determines that the pages in which the blank sheet is to be inserted are registered (YES in step S1507), the process proceeds to step S1508. If the printer driver determines that pages in which the blank sheet is to be inserted are not registered (NO in step S1507), the process proceeds to step S1513. Since the pages in which the blank sheet is to be inserted are registered according to the present exemplary embodiment, the process proceeds to step S1508.

Figure 19C:
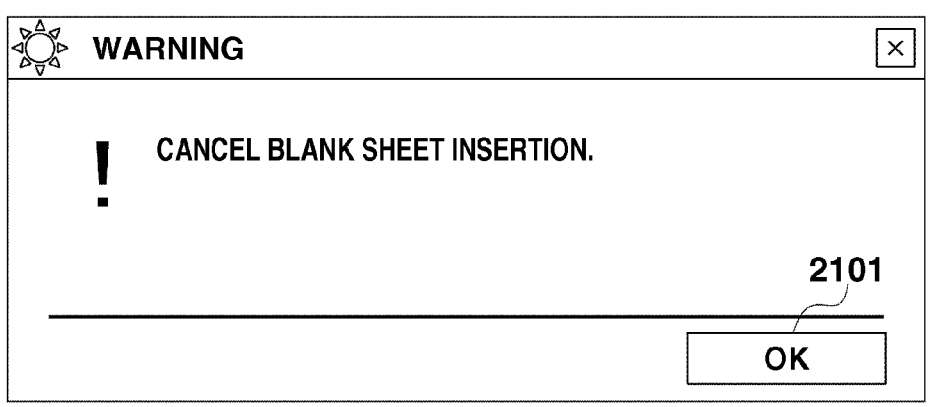

In step S1508, the printer driver displays a message as illustrated in FIG. 19C to warn the user on canceling of the blank sheet insertion. If the user then presses an OK button 2101 illustrated in FIG. 19C, the process proceeds to step S1509. In step S1509, the printer driver calculates the page numbers of the print document which were to be printed on the subset top page before changing the page layout. According to the present exemplary embodiment, page 1, page 4, and page 9 are acquired.

In step S1510, the printer driver calculates, using the equation used in step S1514, the subset top page number candidates after changing the page layout in a case where the user has canceled inserting the blank sheets. According to the present exemplary embodiment, the page numbers of the print document which were to be printed on the subset top page before changing the page layout were page 1, page 3, and page 5. Further, the number of pages to be printed on one sheet set in the page layout is 1, so that the equation becomes as follows:

$$1/1=1$$

$$3/1=3$$

$$5/1=5$$

The subset top page number candidates after changing the page layout thus become page 1, page 3, and page 5.

In step S1511, the printer driver calculates, using the equation used in step S1513, the page numbers of the print document which are to be printed on the subset top page candidates. According to the present exemplary embodiment, since the subset top page numbers after changing the page layout are page 1, page 3, and page 5, and the number of pages to be printed on one sheet set in the page layout is 1, the equation becomes as follows.

$$(1-1)*1+1=1$$

$$(3-1)*1+1=3$$

$$(5-1)*1+1=5$$

As a result, page 1, page 3, and page 5 are acquired as the page numbers of the print document which are to be printed on the subset top page candidates.

In step S1512, the printer driver clears the information stored in the blank sheet insertion page storage area 1801, and the process then proceeds to step S1516. The processes performed from step S1516 and following steps are the same as described above.

Figure 22:
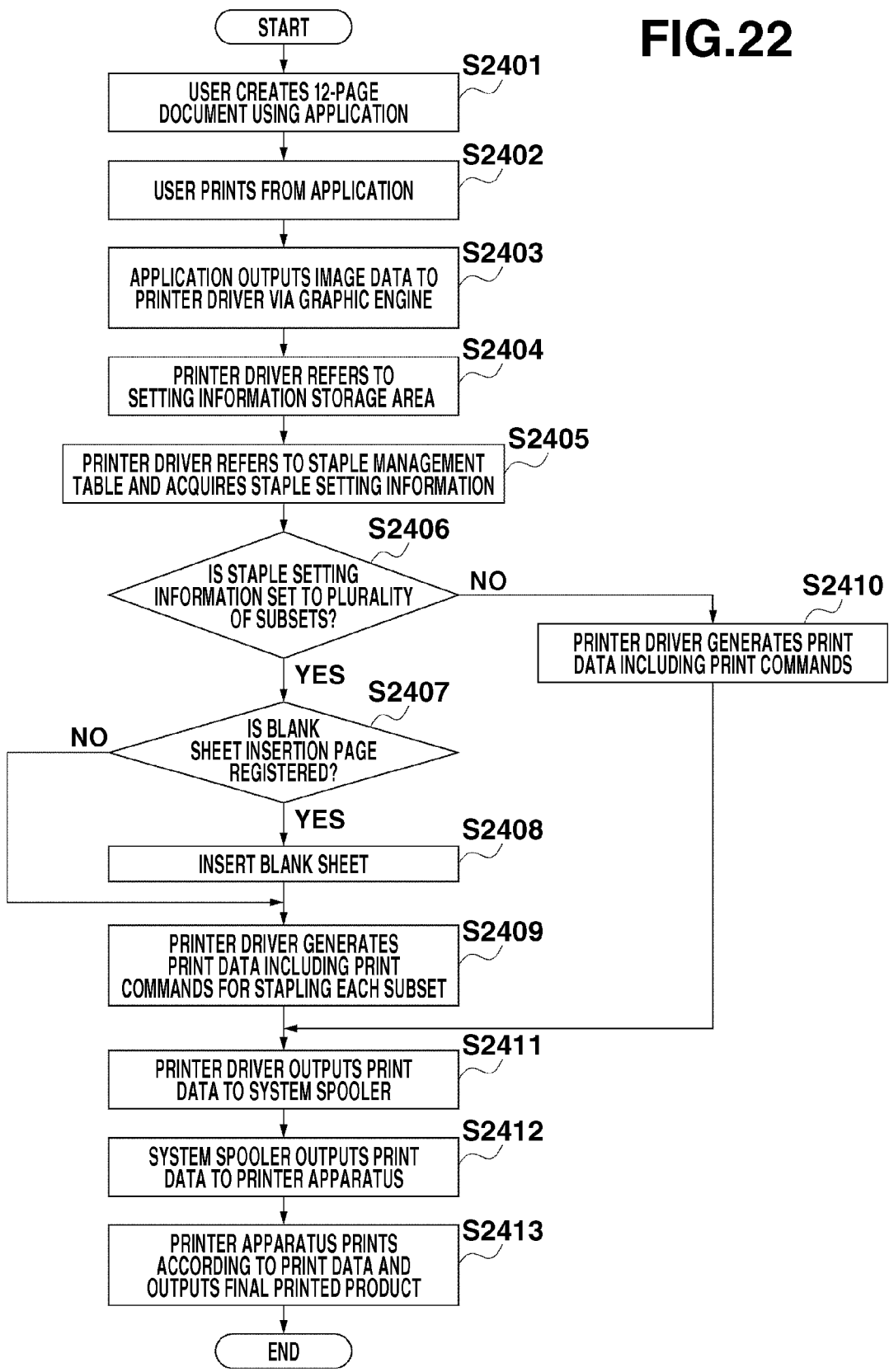
FIG. 22 is a flowchart illustrating a process performed by a printing system according to an exemplary embodiment of the present invention.

The process of dividing a document generated via an application into a plurality of subsets, and printing, stapling, and outputting the subsets via the printer apparatus will be described below with reference to FIGS. 22, 23, and 24. FIG. 22 is a flowchart illustrating a process performed by the printing system according to the present exemplary embodiment. FIGS. 23 and 24 illustrate examples of the print data according to the present exemplary embodiment.

Referring to FIG. 22, in step S2401, the user operates on the application in the information processing apparatus 100 and creates a 12-page print document. In step S2402, the user operates the application and instructs the printer apparatus 150 to print the 12-page print document, thereby activating the printer driver. In step S2403, the application then outputs to the printer driver the image data of the 12-page print document via the graphic engine.

In step S2404, the printer driver refers to the setting information storage area created in the external memory 111 of the information processing apparatus 100 and reads the print setting parameters. In step S2405, the printer driver refers to the staple management table included in the setting information storage area and acquires the staple setting information.

In step S2406, the printer driver determines whether the staple setting information is set to a plurality of subsets. More specifically, if there is a "subset top page" corresponding to a subset number for a plurality of subset numbers, the printer driver determines that the staple setting information is set to a plurality of subsets. If the printer driver determines that the staple setting information is set to a plurality of subsets (YES in step S2406), the process proceeds to step S2407. In step S2407, the printer driver determines whether the pages in which the blank sheet is to be inserted are registered. If the printer driver determines that the pages in which the blank sheet is to be inserted are registered (YES in step S2407), the process proceeds to step S2408. If the printer driver determines that pages in which the blank sheet is to be inserted are not registered (NO in step S2407), the process proceeds to step S2409.

In step S2408, the printer driver creates and inserts a blank sheet in the page position registered in the blank sheet insertion information table.

Figure 16:
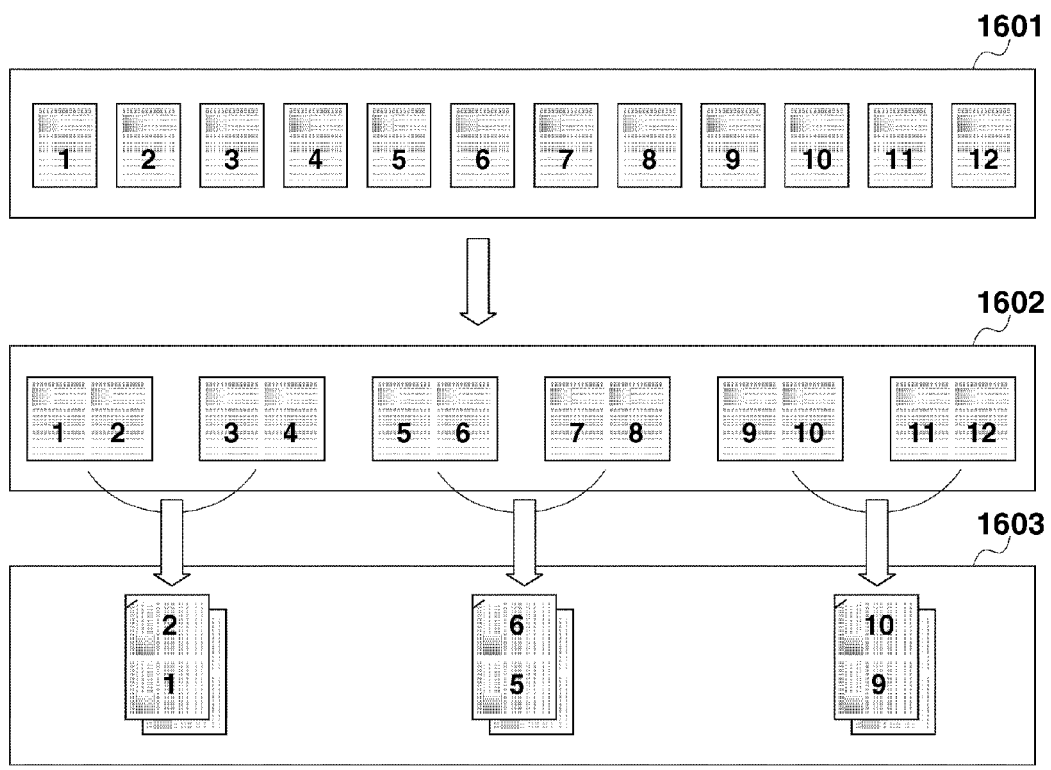
FIG. 16 illustrates a relation between a print document and a final printed product.

In step S2409, the printer driver generates the print data including the print commands for stapling each subset. If the printer driver determines that the staple setting information is not set to a plurality of subsets (NO in step S2406), the process proceeds to step S2410. In step S2410, the printer driver generates the print data including the print command. If the staple setting information is set as illustrated in FIG. 20 according to the present exemplary embodiment, the printer driver creates in step S2409 the image data illustrated as the subsets 1602 in FIG. 16 and the print data illustrated in FIG. 23. In FIG. 16, a document 1601 is similar to the document 901 illustrated in FIG. 9.

FIG. 23 illustrates print data 2 which the printer driver transmits to the printer apparatus 150 according to the above-described process. Referring to FIG. 23, the print data 2 includes a print execution command 2501, a subset 1 print command 2502, a subset 2 print command 2503, and a subset 3 print command 2504. The subset print command includes a subset top page number, the staple information of the subset, and the image data included in the subset.

As illustrated in FIG. 23, the print execution command 2501 instructs printing according to the following parameters, i.e., output paper size: A4, number of copies: 1 copy, paper orientation: 1, zoom ratio: 100%, printing mode: one-sided printing, binding direction: long side binding (left), binding margin: 0 mm, paper discharge mode: staple sort, number of subsets: 3, and discharge destination: auto.

The subset 1 print command 2502 is a command for printing according to the following parameters, i.e., subset top page number applied to the subset 1: 1, the number of staples applied to the subset 1: 1, stapling position applied to the subset 1: upper left corner, and image data included in the subset 1: image data including pages 1 to 2 of the print document collected in one page and pages 3 to 4 of the print document collected in one page.

The subset 2 print command 2503 is a command for printing according to the following parameters, i.e., subset top page number applied to the subset 2: 3, the number of staples applied to the subset 2: 1, stapling position applied to the subset 2: upper left corner, and image data included in the subset 2: image data including pages 5 to 6 of the print document collected in one page and pages 7 to 8 of the print document collected in one page.

The subset 3 print command 2504 is a command for printing according to the following parameters, i.e., subset top page number applied to the subset 3: 5, the number of staples applied to the subset 3: 1, stapling position applied to the subset 3: upper left corner, and image data included in the subset 3: image data including pages 9 to 10 of the print document collected in one page and pages 11 to 12 of the print document collected in one page.

On the other hand, if the staple setting information is set as illustrated in FIG. 21 and the blank sheet insertion information is registered as illustrated in FIG. 18 according to the present exemplary embodiment, the printer driver creates in step S2409 the image data illustrated as the subsets 1702 in FIG. 17. In FIG. 17, a document 1701 is similar to the document 901 illustrated in FIG. 9. Further, the printer driver generates the print data 3 illustrated in FIG. 24, which the printer driver transmits to the printer apparatus 150.

Referring to FIG. 24, the print data 3 includes a print execution command 2601, a subset 1 print command 2602, a subset 2 print command 2603, and a subset 3 print command 2604. The subset print command includes a subset top page number, the staple information of the subset, and the image data included in the subset.

As illustrated in FIG. 24, the print execution command 2601 instructs printing according to the following parameters, i.e., output paper size: A4, number of copies: 1 copy, paper orientation: 1, zoom ratio: 100%, printing mode: one-sided printing, binding direction: long side binding (left), binding margin: 0 mm, paper discharge mode: staple sort, number of subsets: 3, and discharge destination: auto.

The subset 1 print command 2602 is a command for printing according to the following parameters, i.e., subset top page number applied to the subset 1: 1, the number of staples applied to the subset 1: 1, stapling position applied to the subset 1: upper left corner, and image data included in the subset 1: image data including pages 1 to 2 of the print document collected in one page and print document 3 and a blank sheet collected in one page.

The subset 2 print command 2603 is a command for printing according to the following parameters, i.e., subset top page number applied to the subset 2: 3, the number of staples applied to the subset 2: 1, stapling position applied to the subset 2: upper left corner, and image data included in the subset 2: image data including pages 4 to 5 of the print document collected in one page, pages 6 to 7 of the print document collected in one page, and print document 8 and a blank sheet collected in one page.

The subset 3 print command 2604 is a command for printing according to the following parameters, i.e., subset top page number applied to the subset 3: 6, the number of staples applied to the subset 3: 1, stapling position applied to the subset 3: upper left corner, and image data included in the subset 3: image data including pages 9 to 10 of the print document collected in one page and pages 11 to 12 of the print document collected in one page.

The process then proceeds to step S2411, in which the printer driver outputs the print data to the system spooler. In step S2412, the system spooler outputs the print data to the printer apparatus 150 via the bi-directional interface. In step S2413, the printer apparatus 150 performs printing according to the received print data and outputs the final printed product. The process then ends.

If the printer apparatus receives the print data 2 illustrated in FIG. 23, the printer apparatus outputs the final printed product 1603 illustrated in FIG. 16. In other words, with respect to a document having pages 1 to 12, the printer apparatus prints pages 1 to 4 of the print document as one subset and staples the subset in the upper left corner (one position). The printer apparatus then prints pages 5 to 8 of the print document as one subset and staples the subset in the upper left corner (one position), and prints pages 9 to 12 of the print document as one subset and staples the subset in the upper left corner (one position). The printer apparatus then outputs the result as the final print product.

On the other hand, if the printer apparatus receives the print data 3 illustrated in FIG. 24, the printer apparatus outputs the final printed product 1703 illustrated in FIG. 17. In other words, with respect to a document having pages 1 to 12, the printer apparatus prints pages 1 to 3 of the print document and a blank sheet as one subset and staples the subset in the upper left corner (one position). The printer apparatus then prints pages 4 to 8 of the print document and a blank sheet as one subset and staples the subset in the upper left corner (one position), and prints pages 9 to 12 of the print document as one subset and staples the subset in the upper left corner (one position). The printer apparatus then outputs the result as the final print product.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-129198 filed May 28, 2009, which is hereby incorporated by reference herein in its entirety.

What is claimed is:

1. An apparatus comprising:
   a setting unit configured to divide one print data into a plurality of subsets by designating a top page for each of the plurality of subsets and to set a stapling position for each subset;
   a page layout setting unit configured to set a page layout of the print data;
   a determination unit configured to determine, in a case where the page layout has been changed, whether a top page of a subset in the plurality of subsets before the page layout change is a same as a top page of the subset of the plurality of subsets after the page layout change;
   a reception unit configured to receive, in response to the determination unit determining that a top page of a subset in the plurality of subsets before the page layout change is not the same as a top page of the subset of the plurality of subsets after the page layout change, an instruction from a user whether to insert a blank sheet; and
   an adjustment unit configured to, in a case where the reception unit has received the instruction to insert the blank sheet, insert the blank sheet such that a top page of a subset in the plurality of subsets before the page layout change is the same as a top page of the subset of the plurality of subsets after the page layout change, and, in a case where the reception unit has not received the instruction to insert the blank sheet, determine a top page of a subset in the plurality of subsets after the page layout change based on the top page of the subset in the plurality of subsets before the page layout change without inserting the blank sheet.

2. A method performed by a processor in an apparatus, comprising:
   dividing one print data into a plurality of subsets by designating a top page for each of the plurality of subsets and setting a stapling position for each subset;
   setting a page layout of the print data;
   determining, in a case where the page layout has been changed, whether a top page of a subset in the plurality of subsets before the page layout change is a same as a top page of the subset of the plurality of subsets after the page layout change;
   receiving, in response to the determining step determining that a top page of a subset in the plurality of subsets before the page layout change is not the same as a top page of the subset of the plurality of subsets after the page layout change, an instruction from a user whether to insert a blank sheet; and
   wherein, in a case where the receiving step has received the instruction to insert the blank sheet, inserting the blank sheet such that a top page of a subset in the plurality of subsets before the page layout change is the same as a top page of the subset of the plurality of subsets after the page layout change, and, in a case where the receiving step has not received the instruction to insert the blank sheet, determining a top page of a subset in the plurality of subsets after the page layout change based on the top page of the subset in the plurality of subsets before the page layout change without inserting the blank sheet.

3. A non-transitory computer-readable medium storing a program for causing a computer to execute the control method according to claim 2.

* * * * *